US011687616B2

(12) United States Patent
Tsunoda et al.

(10) Patent No.: US 11,687,616 B2
(45) Date of Patent: Jun. 27, 2023

(54) ARITHMETIC PROCESSING APPARATUS, NON-TRANSITORY COMPUTER-READABLE STORAGE MEDIUM, AND ARITHMETIC PROCESSING METHOD

(71) Applicant: FUJITSU LIMITED, Kawasaki (JP)

(72) Inventors: Yukito Tsunoda, Sagamihara (JP); Teruo Ishihara, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 383 days.

(21) Appl. No.: 17/090,940

(22) Filed: Nov. 6, 2020

(65) Prior Publication Data

US 2021/0182360 A1 Jun. 17, 2021

(30) Foreign Application Priority Data

Dec. 13, 2019 (JP) ................. 2019-225931

(51) Int. Cl.
*G06F 17/16* (2006.01)
*G06N 3/08* (2023.01)

(52) U.S. Cl.
CPC ............. *G06F 17/16* (2013.01); *G06N 3/08* (2013.01)

(58) Field of Classification Search
CPC .......... G06F 17/16; G06N 3/08; G06N 3/126; G02F 3/022
USPC ........................................ 708/520
See application file for complete search history.

(56) References Cited

U.S. PATENT DOCUMENTS

2021/0201413 A1* 7/2021 Schillinger ............ G06Q 40/06

FOREIGN PATENT DOCUMENTS

| EP | 3699829 A1 | 8/2020 |
| EP | 3798933 A1 | 3/2021 |
| EP | 3809338 A1 | 4/2021 |
| JP | 2001-283183 A | 10/2001 |
| JP | 2013-161263 A | 8/2013 |
| JP | 2017-162069 A | 9/2017 |
| KR | 102263524 B1 * | 6/2021 |

OTHER PUBLICATIONS

Yukito Tsunoda et al., "Neural-Network Assistance to Calculate Precise Eigenvalue for Fitness Evaluation of Real Product Design", GECCO'19, Prague, Czech Republic, pp. 405-406, Jul. 13-17, 2019 (Total 2 pages).

(Continued)

*Primary Examiner* — Tan V Mai
(74) *Attorney, Agent, or Firm* — Fujitsu Patent Center

(57) ABSTRACT

An arithmetic processing apparatus includes a memory and a processor. The processor coupled to memory and configured to determine an individual not to be evolved to an individual of a second generation from among a plurality of individuals in a first generation based on a predetermined reference for calculation completion of fitness calculation for each of the plurality of individuals, the second generation being a generation next to the first generation, and determine to cause the determined individual to evolve to an individual of a generation next or subsequent to the second generation.

11 Claims, 21 Drawing Sheets

(56) References Cited

OTHER PUBLICATIONS

Nain, Pawan K. S. et al., "Computationally Effective Search and Optimization Procedure Using Coarse to Fine Approximations", Evolutionary Computation, 2003.CEC'03. The 2003 Congress on Canberra, Australia Dec. 8-12, 2003, Piscataway, NJ, USA, IEEE, vol. 3, pp. 2081-2088, Dec. 8, 2003, XP10707083.

Extended European Search Report (EESR) of European Patent Application No. 20204360.0 dated May 28, 2021 Please note NPL "Tsunoda, Yukito "Neural-network assistance to calculate precise eigenvalue for fitness evaluation of real product design" pp. 405-406, XP058473390 . . . " cited herewith, was previously cited in an IDS filed an Nov. 6, 2020.

\* cited by examiner

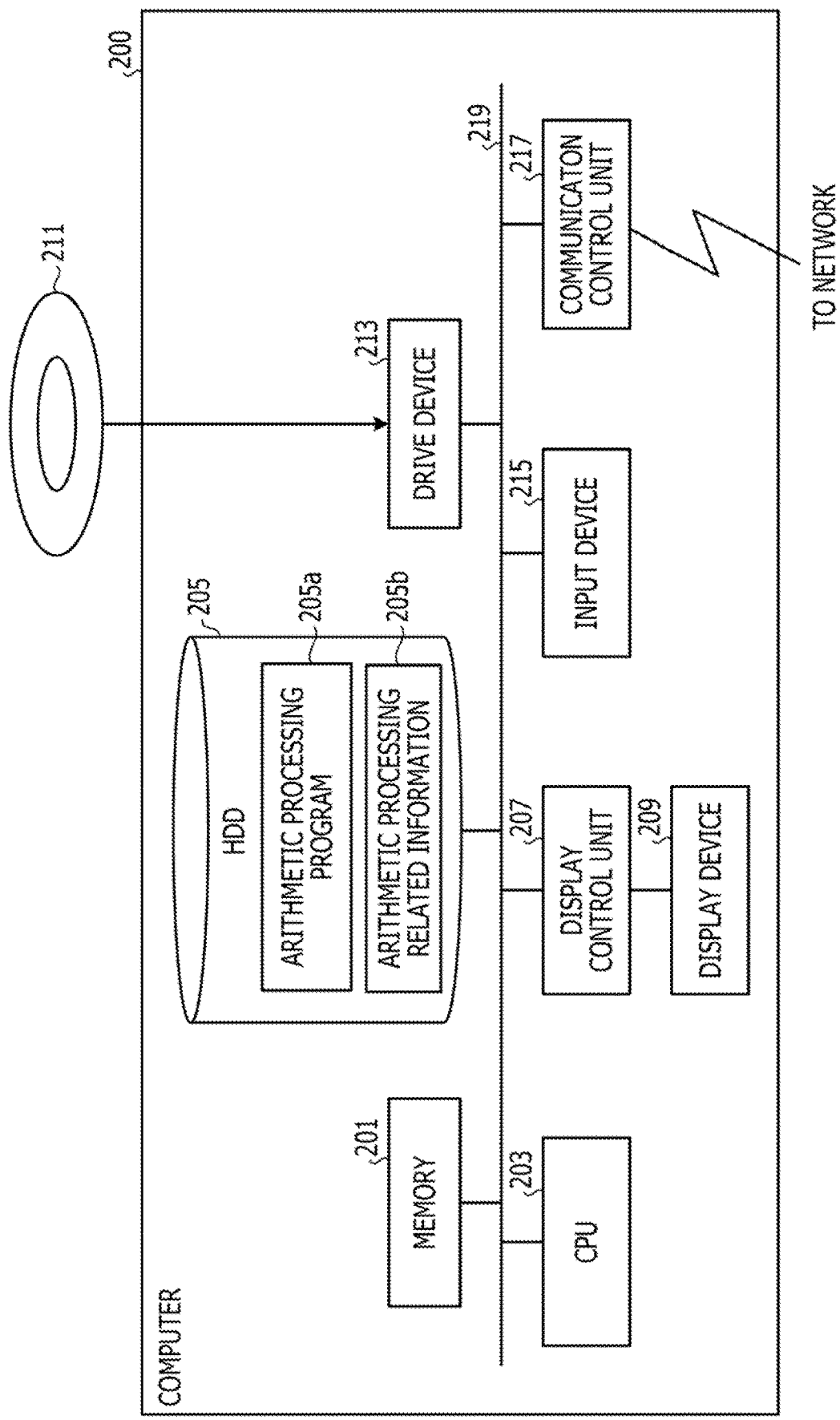

ARITHMETIC PROCESSING APPARATUS, NON-TRANSITORY COMPUTER-READABLE STORAGE MEDIUM, AND ARITHMETIC PROCESSING METHOD

CROSS-REFERENCE TO RELATED APPLICATION

This application is based upon and claims the benefit of priority of the prior Japanese Patent Application No. 2019-225931, filed on Dec. 13, 2019, the entire contents of which are incorporated herein by reference.

FIELD

The embodiments discussed herein are related to an arithmetic processing apparatus, a non-transitory computer-readable storage medium, and an arithmetic processing method.

BACKGROUND

A genetic algorithm (GA) (see Japanese Laid-open Patent Publication No. 2017-162069, for example) has been known as one of evolutionary computation (EC). According to the genetic algorithm, input values are, for example, converted to bit sequences and are generated randomly. Then, input values are selected (by keeping ones having a good characteristic) and crossing and variations are repeated thereon to find an optimum input value.

A technique has been known which applies GA for designing an optimum structure. In order to acquire an optimum structure, evaluation of fitness (performance evaluation) is to be performed. In order to perform the evaluation of fitness, an intensity distribution corresponding to the designed structure is to be acquired. In order to acquire an intensity distribution, an eigen solution that satisfies an eigen solution condition is to be calculated.

For example, a surface acoustic wave (SAW) intensity distribution to be used for optimally designing a structure of an $SiO_2$ layer of an optical SAW filter is acquired based on Expression (1). In order to acquire an SAW intensity distribution, an eigen solution that satisfies an eigen solution condition expressed by Expression (2) is to be calculated. In this example, in order to acquire a proper SAW intensity distribution, an eigen solution that converges to zero ($B_1 = 0$, $A_n = 0$) at both infinite distance is to be calculated.

SAW intensity distribution $S(z)$:  [Expression (1)]

$$S(z) = \begin{cases} A_i \text{Exp}\{K_i(z-zc_i)\} + B_i \text{Exp}\{-K_i(z-zc_i)\} & (N_i < Neff) \\ A_i \text{Cos}\{K_i(z-zc_i)\} + B_i \text{Sin}\{-K_i(z-zc_i)\} & (N_i > Neff) \end{cases}$$

$$K_i = k\sqrt{|N_i^2 - Neff^2|}$$

i: Layer No.

Eigen Solution Condition  [Expression (2)]

$$\begin{bmatrix} A_{n+1} \\ B_{n+1} \end{bmatrix} = \overline{M_{n+1}(zb_n)} \cdot M_n(zb_n) \cdot \overline{M_n(zb_{n-1})} \cdot M_{n-1}(zb_{n-1})$$

$$\ldots \overline{M_2(zb_1)} \cdot M_1(zb_1) \begin{bmatrix} A_1 \\ B_1 \end{bmatrix}$$

$$M_i(z) = \begin{bmatrix} P_i(z) & Q_i(z) \\ \dfrac{dP_i(z)}{dz} & \dfrac{dQ_i(z)}{dz} \end{bmatrix}$$

and $A_1 = 1$, $B_1 = 0$, $A_n = 0$

GA is used for optimally designing a structure of an $SiO_2$ layer of an optical surface acoustic wave (SAW) filter. FIG. 12 is a diagram illustrating a reference example of a design of an optimum structure of $SiO_2$ layer positioning. As illustrated in FIG. 12, an optical SAW filter extracts a signal having a specific wavelength from a signal of optical wavelength division multiplexing. The purposes of optimization of the optical SAW filter are to maximize the SAW intensity $A_L$ over an optical signaling channel and to maximize the ratio of the deviation amount of the SAW intensity to a wavelength (SAW movement distance La/Lb). These purposes of optimization may be realized by positioning of an $SiO_2$ layer.

FIG. 13 is a diagram illustrating a reference example of a flowchart for a structure design of an $SiO_2$ layer by GA. As illustrated in FIG. 13, an arithmetic processing unit generates genes of a first generation (step S110). The arithmetic processing unit divides a surface of an optical SAW filter into regions each having a predetermined length and encodes the regions by using "1" for an $SiO_2$ layer and "0" for regions excluding the $SiO_2$ layer.

The arithmetic processing unit obtains structures corresponding to genes as input values $x_{km}$ (S120), k indicates a generation, and m indicates an input value number within the generation.

The arithmetic processing unit calculates an eigen operating mode of each of the input values $x_{km}$ by using the finite element method (FEM), for example (S130). The condition for solving the equation resulting in h(z) equal to zero is an eigen solution g(z). Because h(z) depends on the structure, it varies in accordance with the input value $x_{km}$. If the possible range of the eigen solution is 1000 points that z may take, the arithmetic processing unit searches eigen solutions and eigen operating modes through all of the 1000 points. As a result, the arithmetic processing unit decides eigen solutions and eigen operating modes. In other words, for example, the point z resulting in h(z) equal to zero is decided as an eigen solution g(z). The SAW intensity distribution as an eigen operating mode is decided based on the eigen solution.

The arithmetic processing unit computes a performance based on the eigen operating mode with respect to the target input value (S140). For example, the arithmetic processing unit computes, as a fitness, an SAW intensity corresponding to the position of the optical signaling channel of each of the structures from the SAW intensity distribution for the input value being each of the structures. When the input value is $x_k$, $f(x_k)$ is calculated as a fitness. In addition, the arithmetic processing unit computes, as a fitness, an SAW movement distance (La/Lb) for an input value being a structure, though not illustrated.

The arithmetic processing unit evaluates the performances (fitnesses) corresponding to the input values (S150). For example, the evaluation of a fitness in the SAW intensity is performed in the way described below. For the input value $x_1$, the fitness is 1.0. For the input value $x_2$, the fitness is 1.2. For the input value $x_3$, the fitness is 1.4. For the input value $x_4$, the fitness is 0.8. Therefore, in this case, the part in which the width indicated by x is around "10" is evaluated as producing the best fitness f(x). In reality, the arithmetic processing unit evaluates the performance including an SAW movement distance.

If an end condition is not satisfied, the arithmetic processing unit selects input values based on the evaluation results (S160). For example, the arithmetic processing unit keeps the input value $x_3$ (=10), the input value $x_1$ (=6) and the input value $x_2(=8)$ having good fitnesses and removes the input value $x_4(=12)$ having the worst fitness.

The arithmetic processing unit generates input values $x_{k+1m}$ of the next generation (S170). For example, the arithmetic processing unit crosses the selected input values and changes the crossed input values to generate input values of the next generation. The arithmetic processing unit evaluates the performances (fitnesses) for the input values of the next generation.

If the end condition is satisfied, the arithmetic processing unit selects an optimum input value based on the evaluation results (step S180).

The description above corresponds to a case where the arithmetic processing unit performs convergence calculation on all points in the possible range of an eigen solution to acquire the eigen solution. The convergence calculation for acquiring an eigen solution takes calculation costs. Accordingly, in order to reduce the calculation costs for acquiring an eigen solution, a technique (see "Neural-Network Assistance to Calculate Precise Eigenvalue for Fitness Evaluation of Real Product Design", for example) is disclosed that predicts approximate eigen solutions by using a neural network (NN), starts a convergence calculation for acquiring an accurate eigen solution from the approximate eigen solutions, and narrows the calculation range.

FIG. 14 is a diagram illustrating a reference example of a flowchart for a structure design for an $SiO_2$ layer by GA using NN prediction. As illustrated in FIG. 14, the arithmetic processing unit generates genes of a first generation (step S210). The arithmetic processing unit divides a surface of an optical SAW filter into regions each having a predetermined length and encodes the regions by using "1" for an $SiO_2$ layer and "0" for regions excluding the $SiO_2$ layer.

The arithmetic processing unit obtains structures corresponding to genes as input values $x_{km}$ (S220). k indicates a generation, and m indicates an input value number within the generation.

The arithmetic processing unit predicts approximate eigen solutions by NN for each of the input values $x_{km}$ (step S230). In other words, for example, the arithmetic processing unit estimates eigen solutions from the input value $x_{km}$ by using NN and rounds off the estimated eigen solutions to one of, for example, 20 kinds of digitized approximate eigen solutions. The NN is a model acquired by learning input values and eigen solutions searched (entire-range searched) by performing convergence calculation on all points of the possible range of the eigen solutions for initial genes (input values) of the first to 25th generations, for example, and outputs approximate eigen solutions for an input value.

The arithmetic processing unit calculates an eigen operating mode of each input value $x_{km}$ by using FEM, for example (S240). In other words, for example, the arithmetic processing unit starts a convergence calculation for acquiring an accurate eigen solution from the approximate eigen solutions predicted by NN and narrows the calculation range. In other words, for example, the arithmetic processing unit substitutes values of z within the range of the approximate eigen solutions sequentially for the equation h(z) and acquires the value of z resulting in zero as an eigen solution. If the acquisition of an eigen solution by the NN prediction fails, the arithmetic processing unit acquires an eigen solution by searching (entire range search) through all points of the possible range of the eigen solution by performing convergence calculation. The SAW intensity distribution as an eigen operating mode is decided based on the eigen solution.

The arithmetic processing unit computes a performance based on the eigen operating mode with respect to the target input value (S250). For example, the arithmetic processing unit computes, as a fitness, an SAW intensity corresponding to the position of the optical signaling channel of each of the structures from the SAW intensity distribution for the input value being each of the structures. When the input value is $x_k$, $f(x_k)$ is calculated as a fitness. In addition, the arithmetic processing unit computes, as a fitness, an SAW movement distance (La/Lb) for an input value being a structure, though not illustrated.

The arithmetic processing unit evaluates the fitnesses corresponding to the input values (S260).

If an end condition is not satisfied, the arithmetic processing unit selects input values based on the evaluation results (S270).

The arithmetic processing unit generates input values $x_{k+1m}$ of the next generation (S280). For example, the arithmetic processing unit crosses the selected input values and changes the crossed input values to generate input values of the next generation. The arithmetic processing unit evaluates the performances (fitnesses) for the input values of the next generation.

If the end condition is satisfied, the arithmetic processing unit selects an optimum input value based on the evaluation results (step S290).

FIG. 15 is a diagram illustrating a reference example indicating reached solutions by GA. As illustrated in FIG. 15, the X axis indicates an SAW intensity $A_L$ over an optical signaling channel as one fitness, and the y axis indicates a wavelength dependency (La/Lb) of the SAW movement distance as one fitness. Because, according to the technique using NN prediction, the quality of an eigen solution is equal to that of a technique without using NN prediction, the structure acquired by evolution is equal. In other words, for example, a Pareto solution (eigen solution) having two kinds of fitness is the same in a technique using NN prediction and a technique without using NN prediction.

FIG. 16 is a diagram illustrating a reference example indicating the total number of calculations executed by GA. In FIG. 16, the left bar chart indicates the total number of calculations for computing an eigen solution by a technique without using NN prediction. The right bar chart indicates the total number of calculations for computing an eigen solution by a technique using NN prediction. According to the technique using NN prediction, the number of calculations for computing an eigen solution may be reduced to ⅓ in the 26th and subsequent generations.

Related techniques are disclosed in for example Japanese Laid-open Patent Publication No. 2017-162069, and "Neural-Network Assistance to Calculate Precise Eigenvalue for Fitness Evaluation of Real Product Design"

SUMMARY

According to an aspect of the embodiments, an arithmetic processing apparatus includes a memory; and a processor coupled to memory and configured to: determine an individual not to be evolved to an individual of a second generation from among a plurality of individuals in a first generation based on a predetermined reference for calculation completion of fitness calculation for each of the plurality of individuals, the second generation being a generation next to the first generation, and determine to cause the determined individual (not to be evolved to the individual of the second generation) to evolve to an individual of a generation next or subsequent to the second generation.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 is a diagram illustrating an example of a computer that executes an arithmetic processing program;

DESCRIPTION OF EMBODIMENTS

Figure 1:
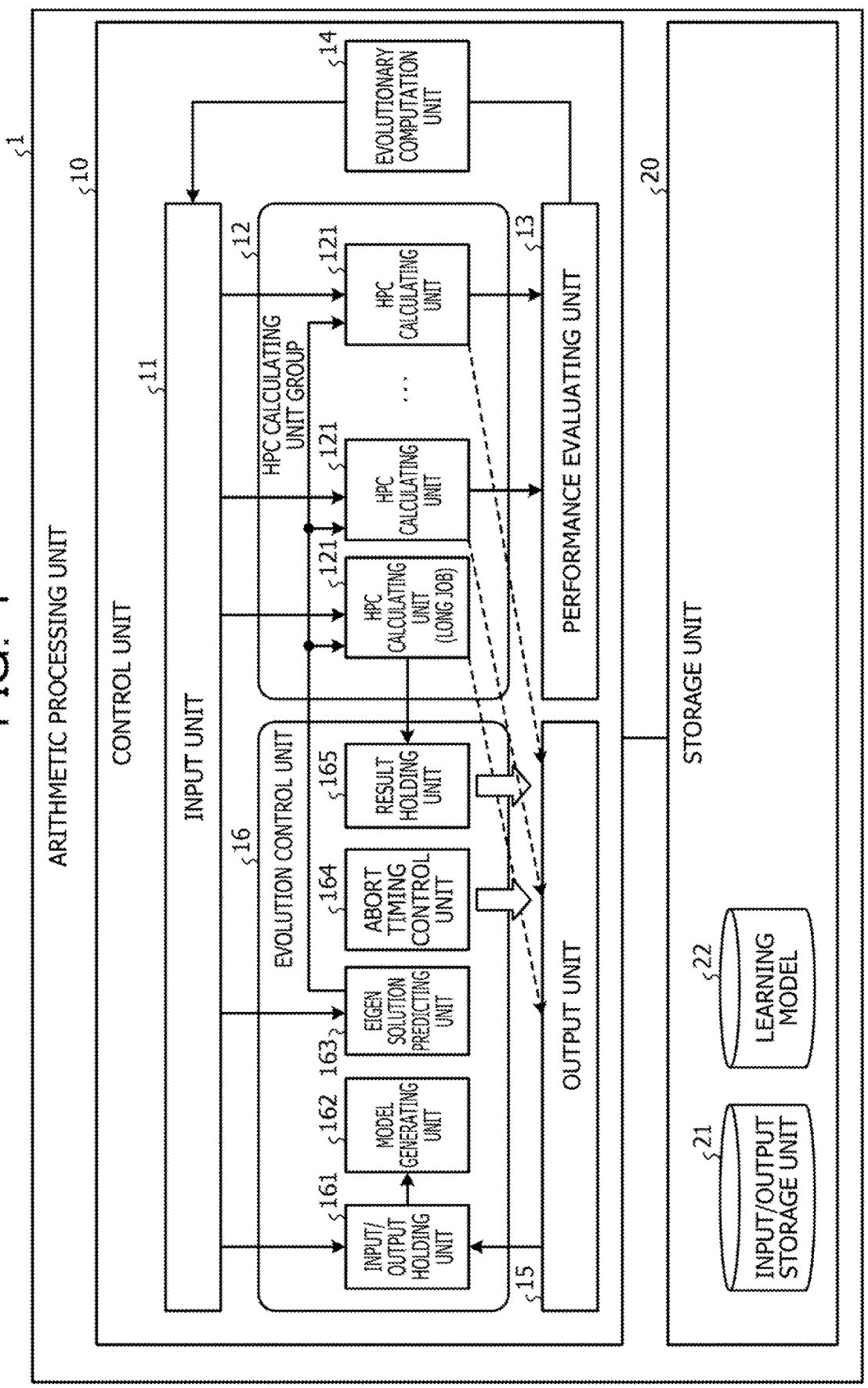
FIG. 1 is a functional block diagram illustrating a configuration of an arithmetic processing unit according to Embodiment 1.

Because the fitness calculation for each gene in each generation by GA is processed independently, the fitness calculations may be performed in parallel. When parallelization is applied to the fitness calculations for genes in each generation by GA using NN prediction, the times to the ends of the calculations differ between genes.

This causes a problem that the speed of the evaluations of fitnesses in each generations may not be increased. In other words, for example, when the fitness calculations for individuals in each generation are parallelized, the calculations for the next generation may not be started until the fitness calculations for all individuals are completed. In other words, for example, the calculation time for evaluations of fitnesses in each generation depends on the processing for the latest individual in the generation.

In particular, for example, according to GA using NN prediction, the number of calculations and the calculation times of the fitness calculations for individuals vary between a case where the NN prediction is right and a case where the prediction is wrong. Therefore, when an individual with wrong prediction exists, the waiting time in the parallelized processing may be long, and the calculation time for the evaluations of fitnesses of the generation may not be reduced. It may also be said that the effect of the speed increase by NN prediction is lowered.

It is an object of one aspect of the present disclosure to keep variety of eigen solutions for fitness calculations and, at the same time, reduce the waiting time due to fluctuations of calculation times when fitness calculations for individuals in evolutionary computation are parallelized.

Embodiments of an arithmetic processing unit, an arithmetic processing program and an arithmetic processing method disclosed herein will be described in detail with reference to drawings. According to embodiments of the present disclosure, a case will be described in which an optimum arrangement (structure design) of an optical signaling channel of an optical. SAW filter that maximizes the SAW intensity over the optical signaling channel and maximizes the ratio of the deviation amount of the SAW intensity to a wavelength (SAW movement distance) is to be acquired by evolutionary computation. The embodiments of the present disclosure will be described by assuming that the evolutionary computation is genetic algorithm (GA). However, the present disclosure is not limited by the embodiments.

Waiting times that occur when fitness calculations for individuals by GA are processed in parallel by using neural-network (NN) prediction and without using NN prediction will be described with reference to FIGS. 17 and 18. The NN prediction is an eigen solution searching technique that predicts approximate eigen solutions by using an NN and starts a convergence calculation for acquiring an accurate eigen solution from the approximate eigen solutions. In the NN prediction, if the acquisition of an eigen solution in the range of approximate eigen solutions fails, an eigen solution is acquired by performing a convergence calculation on all points of the possible range of the eigen solution. Hereinafter, performing search for an eigen solution through all points of a possible range of the eigen solution is called "entire range search". Hereinafter, performing search for an eigen solution through a range of approximate eigen solutions is called "partial range search".

In a case where parallelization is applied to fitness calculations, times to ends of the calculations vary between individuals. Therefore, when the fitness calculations for individuals in each generation are parallelized, the calculations for the next generation may not be started until the fitness calculations for all individuals are completed. In other words, for example, the calculation time for evaluations of fitnesses in each generation depends on the processing for the latest individual.

Figure 17:
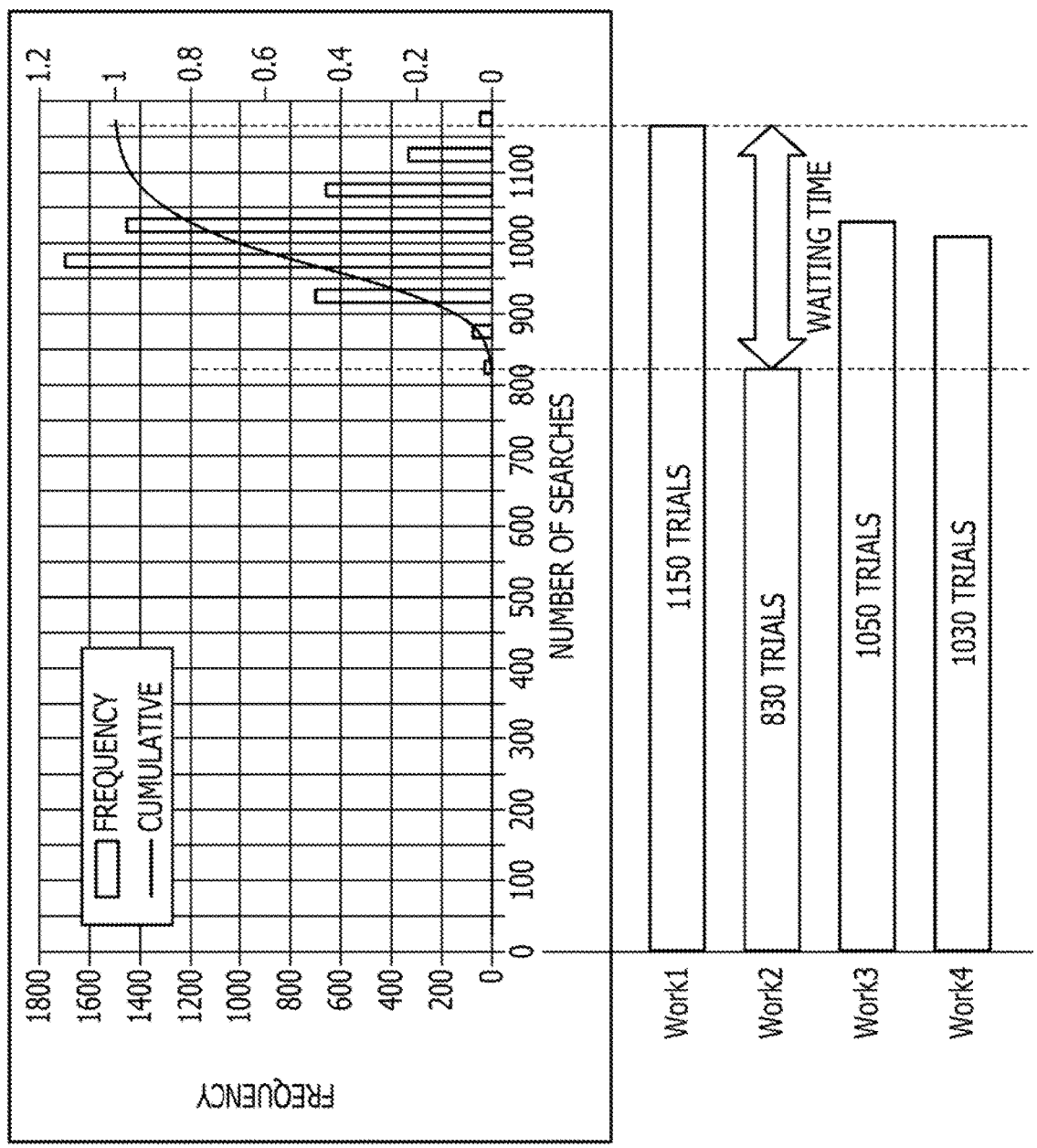
FIG. 17 is a diagram illustrating a reference example of a waiting time when GA is executed without using NN prediction.

FIG. 17 is a diagram illustrating a reference example of a waiting time when GA is executed without using NN prediction. As illustrated in the lower part of FIG. 17, the numbers of searches up to eigen solution acquisition for a plurality of individuals are indicated. The term "Work" indicated in FIG. 17 refers to a device that performs arithmetic processing. For example, in a multi-core CPU, an equal number of Works to the number of cores exist. In a multi-CPU arithmetic processing unit, an equal number of Works to the number of cores×the number of CPUs exist. In a multi-node arithmetic processing unit, an equal number of Works to the number of cores×the number of CPUs×the number of nodes exist.

From the part, it is understood that different numbers of searches are taken up to the ends of calculations for individuals. When fitness calculations are parallelized, calculations for the next generation may not be started until the parallelized fitness calculations for all individuals are completed. Therefore, a waiting time occurs from a time when the calculations by Work 2 are completed the earliest to a time when the calculations by Work 1 are completed the latest. Because the processing is performed without using NN prediction, the numbers of searches are concentrated in a range from 800 to 1200 as indicated in the upper part of FIG. 17. Therefore, the fluctuations of the numbers of searches up to the fitness calculations for the individuals are small, and the waiting time occurring when the calculations are parallelized is short.

Figure 18:
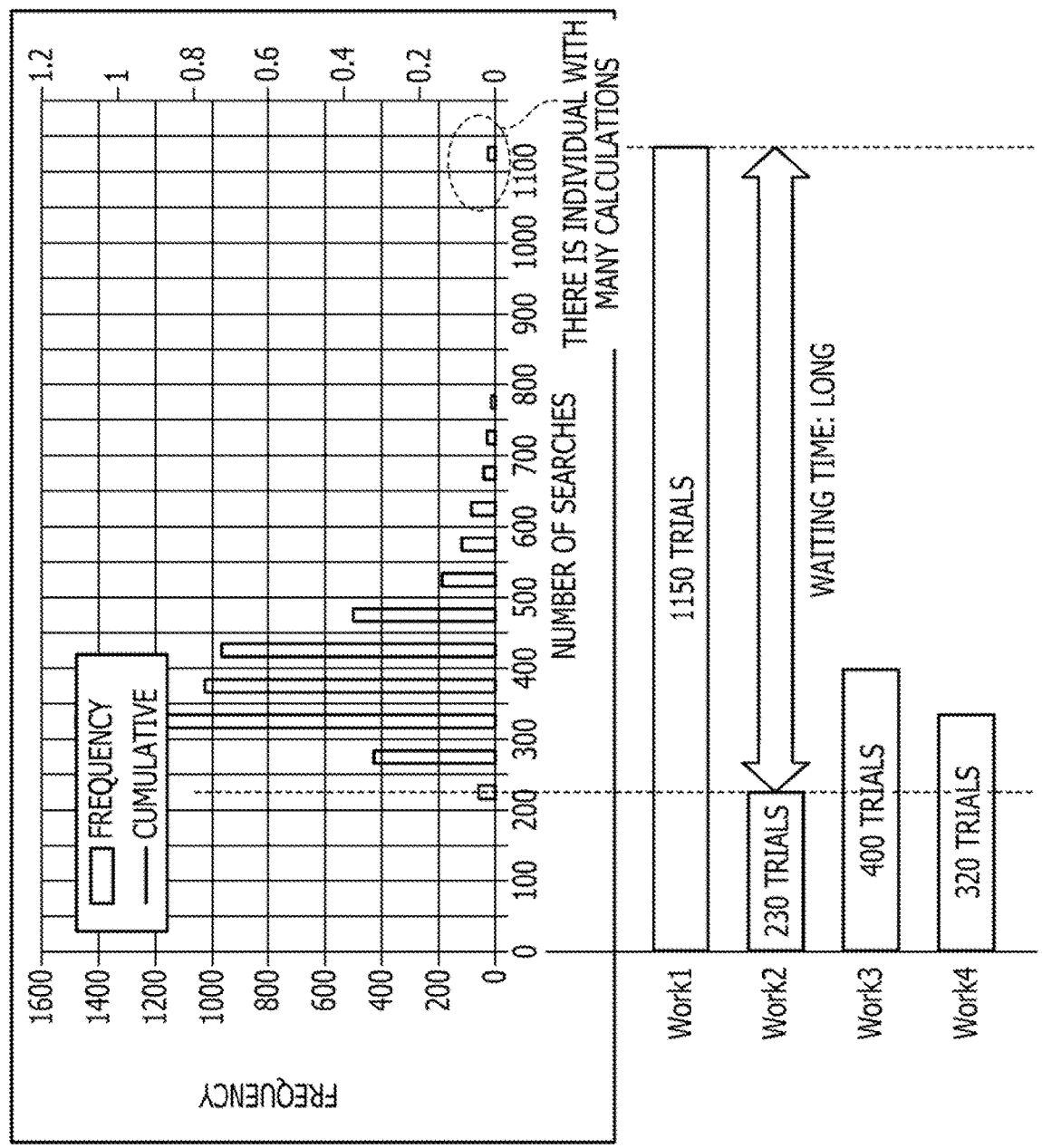
FIG. 18 is a diagram illustrating a reference example of a waiting time when GA is executed by using NN prediction.

FIG. 18 is a diagram illustrating a reference example of a waiting time when GA is executed by using NN prediction. As illustrated in the lower part of FIG. 18, the numbers of searches up to eigen solution acquisition for a plurality of individuals are indicated. From the part, it is understood that different numbers of searches are taken up to the ends of calculations for individuals. In other words, for example, if an NN prediction is right, the trials end with the partial range search. Therefore, the number of searches is low. If the prediction is wrong, the entire-range search is performed. Therefore, the number of searches is high. When fitness calculations are parallelized, calculations for the next generation may not be started until the parallelized fitness calculations for all individuals are completed. Therefore, a waiting time occurs from a time when the calculations by Work 2 are completed the earliest to a time when the calculations by Work 1 are completed the latest. In the NN prediction, the number of searches up to the fitness computation fluctuates between a case where the NN prediction is right and a case where the prediction is wrong. Therefore, the waiting time in the parallelization is long. As illustrated in the upper part of FIG. 18, the number of searches fluctuates from 200 to 1200 with a peak around 300. Therefore, the fluctuations of the numbers of searches up to the fitness computation for the individuals are large, and the waiting time occurring when the calculations are parallelized is long. In other words, for example, it may also be said that the effect of the speed increase by NN prediction is lowered.

Therefore, when the fitness calculations for individuals by GA are processed in parallel, the speed of evaluations of the fitnesses in each of generations may not be increased.

According to the following embodiments, an arithmetic processing unit will be described that may keep variety of eigen solutions for fitness calculations and, at the same time, reduce the waiting time due to fluctuations of calculation times when fitness calculations for individuals by GA are processed in parallel.

Embodiment 1

[Configuration of Arithmetic Processing Unit]

FIG. 1 is a functional block diagram illustrating a configuration of an arithmetic processing unit according to Embodiment 1. In order to reduce a waiting time due to fluctuations between calculation times in evolutionary computation that calculates fitnesses of a plurality of individuals based on a plurality of inputs by parallelization, an arithmetic processing unit 1 illustrated in FIG. 1 performs the following processing. The arithmetic processing unit 1 causes an individual having a long calculation time in the currently processed generation to join to one subsequent generation.

Figure 2A:
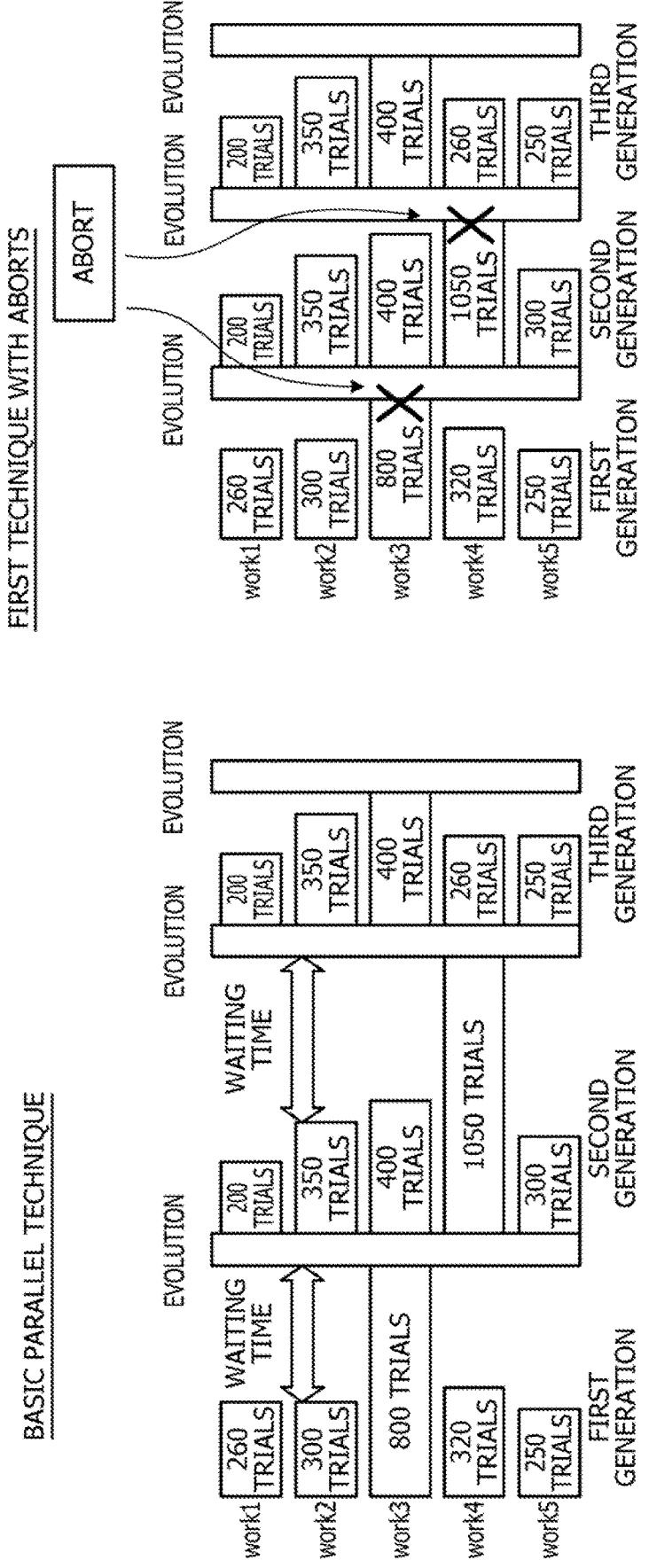
FIG. 2A is a diagram illustrating abort timing control over eigen solution search.
Figure 2B:
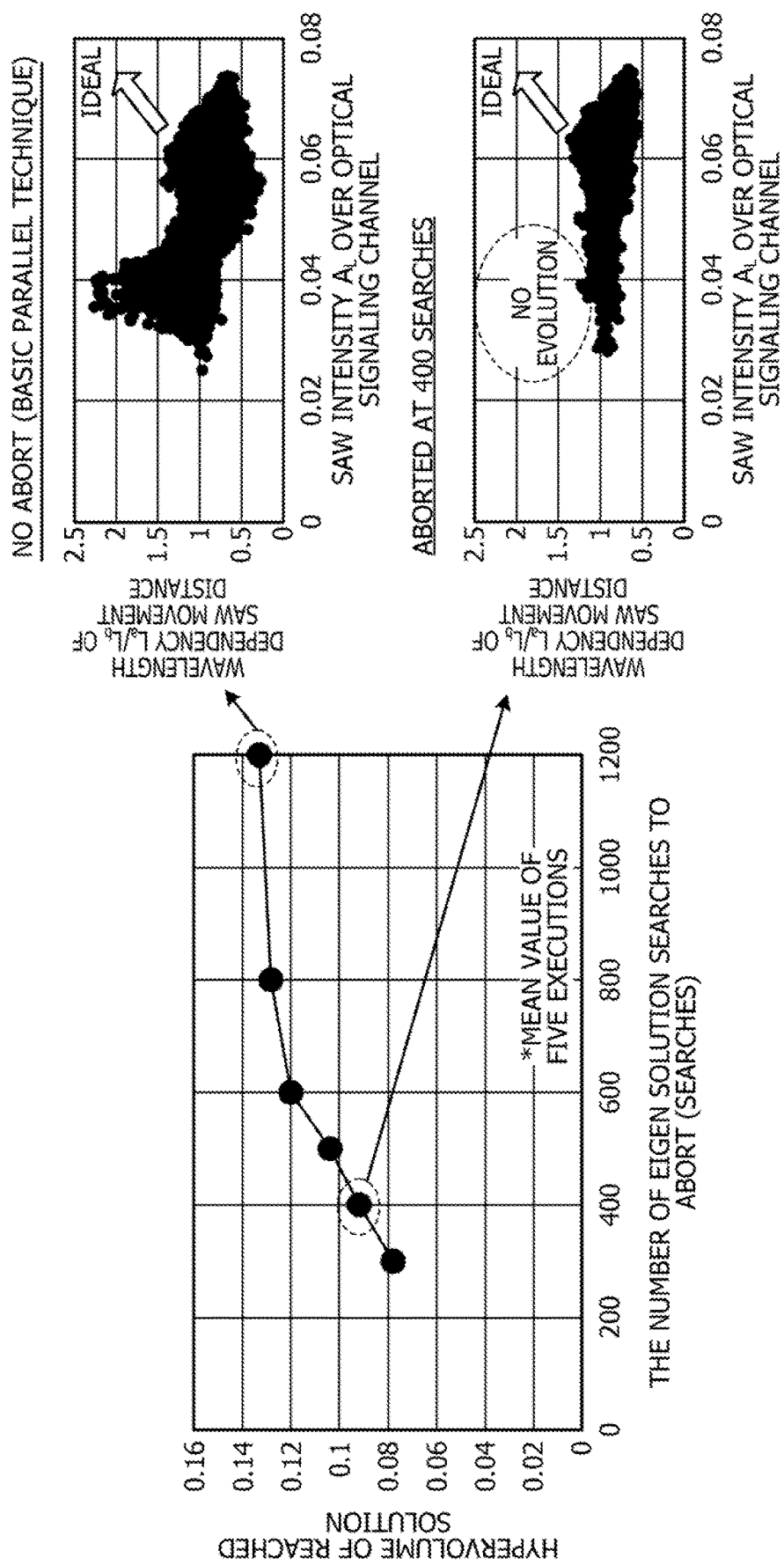
FIG. 2B is a diagram illustrating evaluation results of abort timing control over eigen solution search.

It may also be considered to abort an eigen solution search for an individual having a long calculation time in the currently processed generation in order to reduce the waiting time due to fluctuations of calculation times. Abort timing control over eigen solution search will be described with reference to FIGS. 2A and 2B. FIG. 2A is a diagram illustrating abort timing control over eigen solution search. FIG. 2B is a diagram illustrating evaluation results of abort timing control over eigen solution search.

The left part of FIG. 2A illustrates the numbers of searches for eigen solution search and waiting times for individuals in a case where the eigen solution is not aborted and NN prediction is used. The number of searches by Work 3 is 800 in the first generation, which is the latest, and the number of searches by Work 4 in the second generation is 1050, which is the latest. It is found from experiments that the individuals with a number of searches beyond 500, for example, correspond to 10% or lower of the entire individuals according to GA using NN prediction.

Accordingly, as illustrated in the right part of FIG. 2A, a reference for aborting the eigen solution search is set as 500, for example, and the eigen solution search for an individual beyond 500 is aborted, and the processing is shifted to the next generation. Thus, the waiting time due to the parallelization may be reduced. The arithmetic processing unit executes the fitness evaluation on the aborted individual by determining that the fitness of the individual is the lowest.

FIG. 2B illustrates the number of searches as an abort reference and results of evaluations of relationships of quality of eigen solutions (reached solutions) reached by GA. The left part of FIG. 2B illustrates a graph having an X axis indicating the number of eigen solution searches to abort and a Y axis indicating hypervolume of the reached solutions. The right part of FIG. 2B illustrates a solution distribution indicating a relationship of quality of eigen solutions (reached solutions) reached by evolutionary computation when the X axis indicates SAW intensity $A_L$ over an optical signaling channel as one fitness and the Y axis indicates wavelength dependency (La/Lb) of an SAW movement distance as one fitness. The upper right part of FIG. 2B is a solution distribution in a case where the eigen solution search is not aborted. The lower right part of FIG. 2B is a solution distribution in a case where the number of eigen solution searches to abort is 400. The term "hypervolume" of a reached solution refers to an evaluation scale for a solution distribution and is an area calculated from the solution distribution.

As illustrated in the lower right part of FIG. 2B, when the number of eigen solution searches to abort is 400, the variety of the reached solutions is lowered. In other words, for example, the evolution in the right direction (the direction of an increase of $A_L$) of the solution distribution is substantially equal to that of the case where the search for eigen solutions is not aborted while the evolution in the upper direction (the direction of an increase of La/Lb) of the solution distribution is smaller than the case where search for eigen solutions is not aborted. In other words, for example, the variety of eigen solutions is lowered. As illustrated in the left part of FIG. 2B, when the number of eigen solution searches to abort is 400, the quality (hypervolume) is lower than the case where the eigen solution search is not aborted. It is inferred that this is because the evolution in the range where NN prediction is aborted is suppressed.

Accordingly, the arithmetic processing unit 1 causes the searches for an individual with the number of searches of eigen solution search beyond a threshold value to be joined to the next generation in order to reduce the waiting time due to fluctuations of the calculation times and to maintain the variety of eigen solutions.

Figure 3:
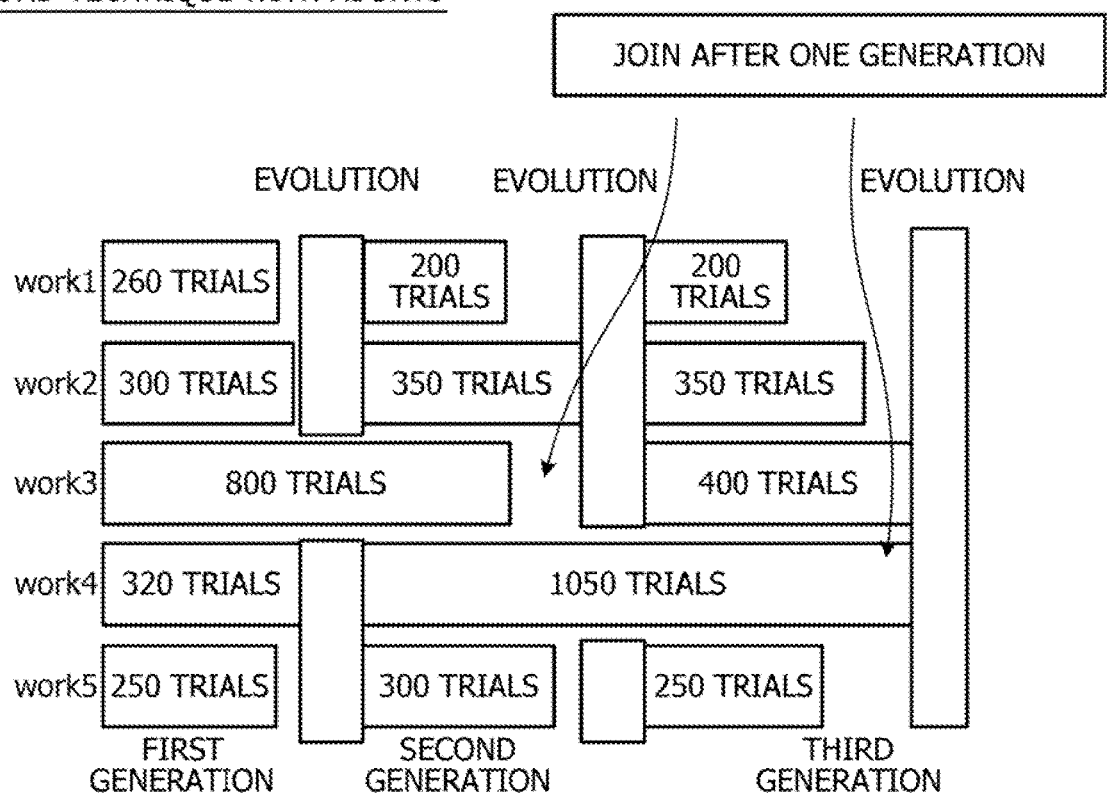
FIG. 3 is a diagram illustrating an example of abort timing control over eigen solution search according to Embodiment 1.

FIG. 3 is a diagram illustrating an example of abort timing control over eigen solution search according to Embodiment 1. As illustrated in FIG. 3, the arithmetic processing unit 1 aborts to search, in the generation in processing, an individual with the number of searches of eigen solution search beyond a threshold value in the generation in processing and causes the individual to be joined to one subsequent generation. For example, when the threshold value is 500, the arithmetic processing unit 1 performs evaluation of fitness on individuals having searches completed when the number of searches exceeds 500, causes the individuals to evolve, and shifts the processing to the next generation. The arithmetic processing unit 1 causes the individuals with the number of searches exceeding 500 to be joined to the next generation. In the evolutionary computation, it is considered that performing the evolution processing (selection, crossing, variations and so on) in one subsequent generation has a minor influence.

Referring back to FIG. 1, the arithmetic processing unit 1 includes a control unit 10 and a storage unit 20.

The control unit 10 corresponds to an electronic circuit such as a central processing unit (CPU). The control unit 10 has an internal memory for storing programs defining various processing procedures and control data and executes various processing using the programs and data. The control unit 10 includes an input unit 11, a high-performance computing (HPC) calculating unit group 12, a performance evaluating unit 13, an evolutionary computation unit 14, an output unit 15, and an evolution control unit 16.

The storage unit 20 is, for example, a semiconductor memory device such as a random-access memory (RAM) or a flash memory, or a storage device such as a hard disk or an optical disk. The storage unit 20 has an input/output storage unit 21 and a learning model 22.

The input/output storage unit 21 stores an input value and an output value (fitness) in the past and an eigen solution in association. The input/output storage unit 21 is stored by an input/output holding unit 161, which will be described below. The term "input value" here refers to a structure corresponding to a gene. The term "gene" here refers to one acquired by encoding an $SiO_2$ layer to "1" and a region excluding the $SiO_2$ layer to "0" of regions acquired by dividing a surface of an optical SAW filter into the regions each having a predetermined length. The term "fitness" here refers to a value of a wavelength dependency (La/Lb) of an SAW intensity and an SAW movement distance over an optical signaling channel to an input value.

The learning model 22 is a resulting model of learning for acquiring a range of an eigen solution corresponding to a new input value by using input values in the past and eigen solutions corresponding to the input values. The learning model 22 learns by a technique using a neural network (NN), for example. The learning model 22 is generated by a model generating unit 162, which will be described below.

The input unit 11 outputs input values to be designed and to be used for generating the learning model 22 to HPC calculating units 121, which will be described below, and the input/output holding unit 161, which will be described below. The input unit 11 outputs input values to be designed and to be used for predicting an eigen solution by using the learning model 22 to an eigen solution predicting unit 163, which will be described below.

The HPC calculating unit group 12 has the plurality of HPC calculating units 121. Hereinafter, one HPC calculating unit 121 will be described.

The HPC calculating unit 121 receives an input value to be designed of a predetermined generation and acquires an eigen solution satisfying an eigen solution condition for the input value. In other words, for example, the HPC calculating unit 121 searches an eigen solution satisfying an eigen solution condition for an input value from an entire possible range of the eigen solution. For example, representing a function for acquiring $A_n$ by $h(z)$ when $A_1=1$ and $B_1=0$ in the eigen solution condition of Expression (2) are input, the HPC calculating unit 121 solves an equation resulting in $A_n$ or $h(z)$ equal to zero because of a condition of $A_n=0$. The condition for solving the equation resulting in zero is an eigen solution $g(z)$. The possible range of the eigen solution is all possible points of z. Therefore, the HPC calculating unit 121 searches an eigen solution resulting in $h(z)$ equal to zero through all possible points of z. In other words, for example, the HPC calculating unit 121 performs the entire range search that searches through all possible points of z. The HPC calculating unit 121 outputs the eigen solution for the input value, which is searched by the entire range search, to the output unit 15, which will be described below.

In addition, the HPC calculating unit 121 computes an SAW intensity distribution (eigen action) as an objective function based on the eigen solution. For example, the HPC calculating unit 121 computes an SAW intensity distribution corresponding to the eigen solution based on Expression (1). The HPC calculating unit 121 substitutes the eigen solution for Neff in Expression (1) to compute an SAW intensity distribution corresponding to the eigen solution. The HPC calculating unit 121 computes an SAW intensity for an input value as one fitness by using the SAW intensity distribution for the input value. In addition, the HPC calculating unit 121 computes the value of the wavelength dependency (La/Lb) of the SAW movement distance to the input value as one fitness. The HPC calculating unit 121 outputs the fitness for the input value to the performance evaluating unit 13 and the output unit 15, which will be described below.

When calculations of searches for an eigen solution are not completed and if the HPC calculating unit 121 receives a notice of an abort timing from an abort timing control unit 164, which will be described below, the HPC calculating unit 121 continues the calculation of searches for an eigen solution. When the calculations of searches for an eigen solution are completed, the HPC calculating unit 121 computes an SAW intensity distribution (eigen action) as an objective function based on the eigen solution. The HPC calculating unit 121 computes an SAW intensity for the input value as one fitness by using the SAW intensity distribution for the input value. In addition, the HPC calculating unit 121 computes the value of the wavelength dependency (La/Lb) of the SAW movement distance to the input value as one fitness. The HPC calculating unit 121 outputs the fitness for the input value to a result holding unit 165. This is for holding the fitness not as a result of the generation when the input value is generated but as a result of the next generation of the generation.

The performance evaluating unit 13 evaluates the performance of each of the input values based on the fitness of each of the input values. For example, if the performance evaluating unit 13 receives a notice of abort timing from the abort timing control unit 164, which will be described below, the performance evaluating unit 13 evaluates the performance of each of the input values by using the fitness of each of the input values output from the HPC calculating units 121 and the fitness of each of the input values held in the result holding unit 165, which will be described below. In other words, for example, the performance evaluating unit 13 collectively evaluates performance results of the input values of the current generation with the eigen solution search completed and the performance results held for the preceding generation. The performance evaluating unit 13 selects fitting input values or input values to keep from the plurality of input values based on the evaluation results of the performances of the input values.

The evolutionary computation unit 14 crosses the selected input values and changes the crossed input values to generate the input values of the next generation. The evolutionary computation unit 14 outputs the input values of the next generation to the input unit 11.

The output unit 15 outputs the eigen solutions and fitnesses for input values, which are output from the HPC calculating units 121 and searched by the entire range search, to the input/output holding unit 161, which will be described below.

The evolution control unit 16 includes the input/output holding unit 161, the model generating unit 162, the eigen solution predicting unit 163, the abort timing control unit 164, and the result holding unit 165.

The input/output holding unit 161 holds, in the input/output storage unit 21, the eigen solutions and fitnesses for input values, which are searched by the entire range search.

The model generating unit 162 generates the learning model 22 that predicts the range in which the eigen solutions satisfying an eigen solution condition for input values exist based on eigen solutions for the input values, which are searched by the entire range search. For example, the model generating unit 162 causes a neural network (NN) to learn input values and eigen solutions, which are stored in the input/output storage unit 21 and searched by the entire range search, and generates the learning model 22 that predicts the range of the eigen solution for an input value. The model generating unit 162 may generate the learning model 22 by using eigen solutions for input values from the first generation to the mth generation. The mth generation is, for example, the 25th generation.

Figure 4:
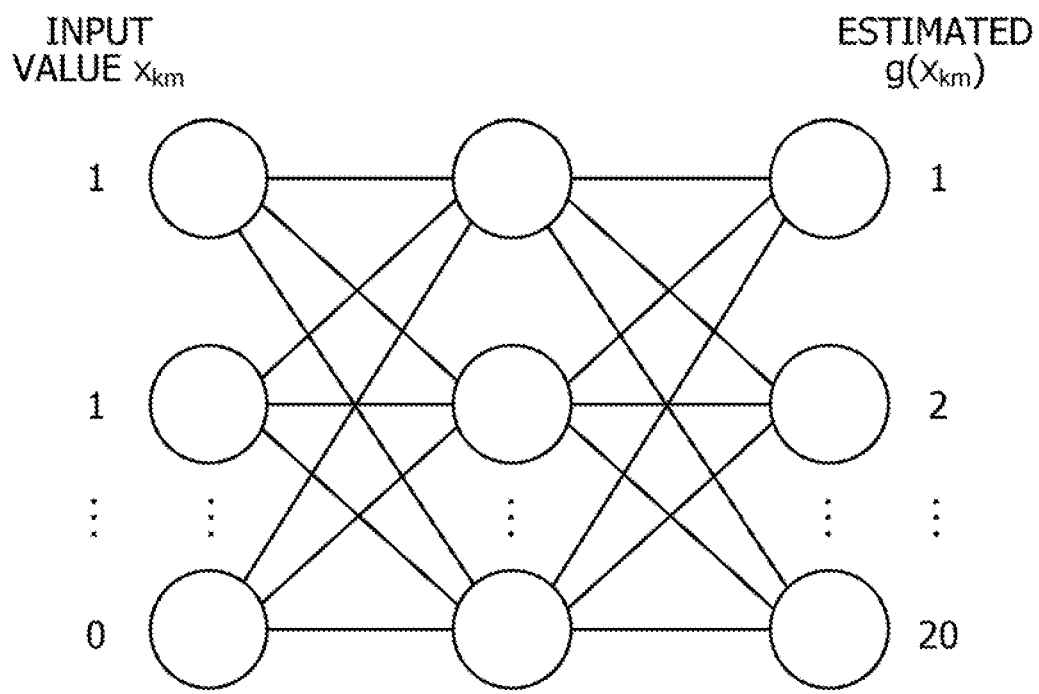
FIG. 4 is a diagram illustrating model generation according to Embodiment 1.

The model generation by the model generating unit 162 will be described with reference to FIG. 4. FIG. 4 is a diagram illustrating model generation according to Embodiment 1. As illustrated in FIG. 4, the model generating unit 162 causes an NN to learn input values $x_{km}$, and eigen solutions $g(x_{km})$ and thus generates the learning model 22 that predicts an estimation $g(x_{km})$ for an input value. The term "estimation $g(x_{km})$" refers to a range of an eigen solution. k indicates a generation, and m indicates an input value number within the generation.

Referring back to FIG. 1, the eigen solution predicting unit 163 uses the learning model 22 to predict the range (solution candidate range) in which the eigen solution for an input value exists. The eigen solution predicting unit 163 searches an eigen solution for an input value, which satisfies the eigen solution condition for the input value, within the predicted eigen solution range.

For example, representing a function for acquiring $A_n$ by $h(z)$ when $A_1=1$ and $B_1=0$ in the eigen solution condition of Expression (2) are input, the eigen solution predicting unit 163 solves an equation resulting in $A_n$ or $h(z)$ equal to zero because of a condition of $A_n=0$. The condition for solving the equation resulting in zero is an eigen solution $g(z)$. The range of z for solving the equation resulting in zero is the predicted eigen solution range (partial range). The eigen solution predicting unit 163 searches an eigen solution through points within the predicted eigen solution range and thus predicts an eigen solution. In other words, for example, the eigen solution predicting unit 163 performs the partial range search that searches through points within the predicted eigen solution range. In other words, for example, the eigen solution predicting unit 163 substitutes values of z within the eigen solution range sequentially for the equation $h(z)$ and predicts the value of z resulting in zero as an eigen solution.

If the eigen solution prediction succeeds, the eigen solution predicting unit 163 outputs the eigen solution along with the input value to the HPC calculating unit 121. This is for causing the HPC calculating unit 121 to compute an SAW intensity distribution (eigen action) of the eigen solution for the input value and to compute the fitness for the input value. On the other hand, if the eigen solution prediction fails, the eigen solution predicting unit 163 outputs the input value for the eigen solution resulting from the prediction failure to the HPC calculating unit 121. This is for causing the HPC calculating unit 121 to acquire an eigen solution for the input value by the entire range search.

[Description of Eigen Solution Prediction]

Figure 5:
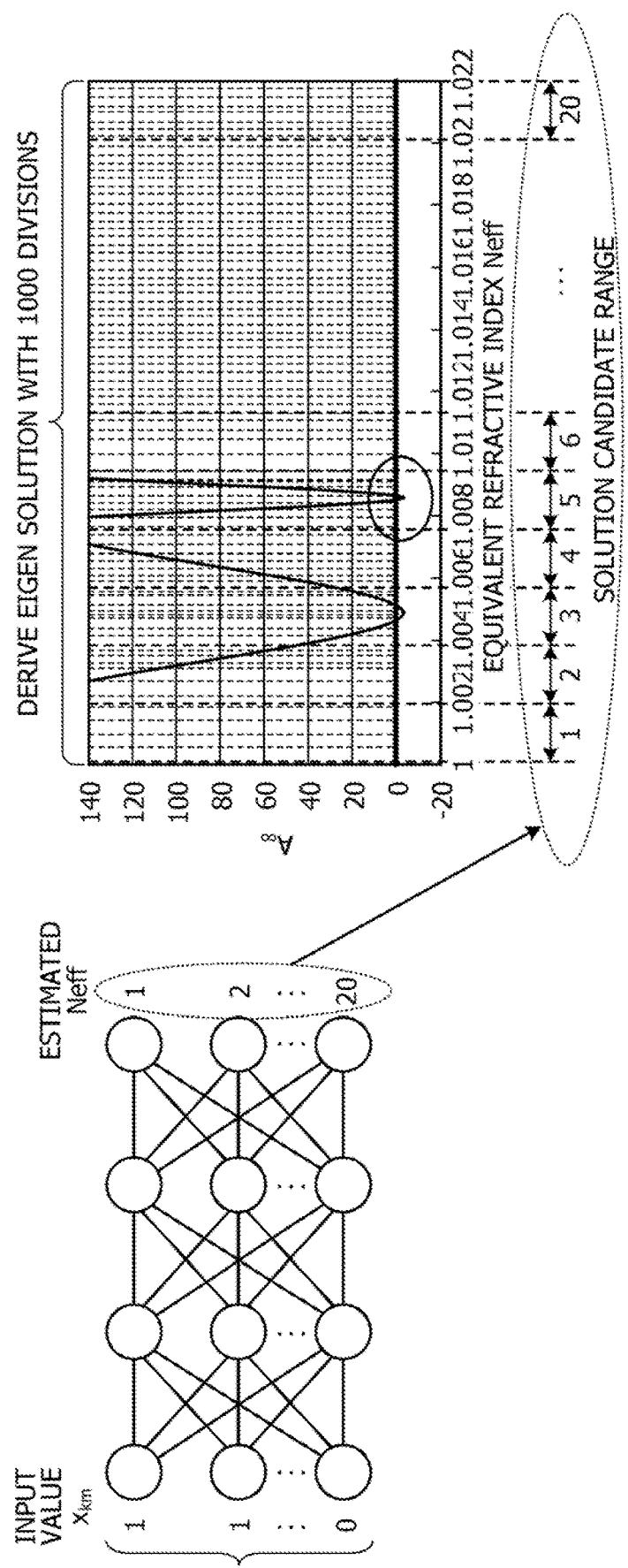
FIG. 5 is a diagram illustrating eigen solution prediction according to Embodiment 1.

The eigen solution prediction by the eigen solution predicting unit 163 will be described with reference to FIG. 5. FIG. 5 is a diagram illustrating the eigen solution prediction according to Embodiment 1. In FIG. 5, the solution candidate range is divided in advance into 20 ranges for 50 points acquired by dividing 1000 points by 20.

First, by using the learning model 22 illustrated in the left part of FIG. 5, the eigen solution predicting unit 163 predicts a solution candidate range for input values $x_{km}$.

Next, as illustrated in the right part of FIG. 5, the eigen solution predicting unit 163 searches an eigen solution for an input value, which satisfies the eigen solution condition for the input value, within the predicted solution candidate range. It is assumed here that the predicted solution candidate range is "5". Within the range indicated by the solution candidate range "5", the eigen solution predicting unit 163 solves an equation in which the function $h(z)$ for acquiring $A_n$ when input of $A_1=1$ and $B_1=0$ of the eigen solution condition of Expression (2) results in zero because of a condition of $A_n=0$. In other words, for example, the eigen solution predicting unit 163 substitutes values of z within the range indicated by the solution candidate range "5" for the equation $h(z)$. If the function $h(z)$ results in zero with one of z values within the solution candidate range or if the eigen solution prediction succeeds, the eigen solution predicting unit 163 predicts the z value with which the function $h(z)$ results in zero as an eigen solution. Thus, compared with the case of the entire range search that searches through all points within a possible range of a solution, the eigen solution predicting unit 163 may search only in the $\frac{1}{20}$ range, resulting in reduction of the amount of computational complexity to $\frac{1}{20}$ and increasing the processing speed.

If the function $h(z)$ does not result in zero with z values within the solution candidate range or if the eigen solution prediction fails, the eigen solution predicting unit 163 may cause the HPC calculating unit 121 to acquire an eigen solution by the entire range search.

The abort timing control unit 164 controls timing for aborting eigen solution search for a plurality of input values in a first generation, which are calculated by the plurality of HPC calculating units 121. For example, the abort timing control unit 164 controls timing for aborting eigen solution search in a first generation based on the number of searches of the eigen solution search.

As an example, the abort timing control unit 164 decides input values not to be evolved to input values of a second generation, which is the next generation of the first generation, based on the number of searches of eigen solution search for a plurality of input values in the first generation. More specifically, for example, the abort timing control unit 164 decides, as input values not to be evolved to input values of the second generation, input values for which eigen solution search has not been completed yet when the number of searches of the eigen solution search exceeds a reference value of the number of searches of the eigen solution search among a plurality of input values of the first generation. The abort timing control unit 164 decides to evolve the input values not to be evolved to input values of the second generation but to input values of a generation subsequent to the second generation. The abort timing control unit 164 notifies the HPC calculating unit 121 performing the eigen solution search for the decided input values of that it is the abort timing. The abort timing control unit 164 notifies the performance evaluating unit 13 of that it is the abort timing to perform performance evaluation on the input values for which the eigen solution search has already been completed when the number of searches of the eigen solution search exceeds the reference value of the number of searches of the eigen solution search among a plurality of input values of the first generation. In other words, for example, it may also be said that the abort timing control unit 164 controls the timing to evolve.

Having described that the abort timing control unit 164 controls timing for aborting eigen solution search based on the number of searches of the eigen solution search, the embodiments are not limited thereto. The abort timing control unit 164 may control timing for aborting eigen solution search based on the calculation time of the eigen solution search instead of the number of searches of eigen solution search. The abort timing control unit 164 may control timing for aborting eigen solution searches based on the number of individuals (the number of input values) for which eigen solution search has been completed. The abort timing control unit 164 may control the timing for aborting eigen solution searches based on the proportion of the number of HPC calculating units 121 in execution which have completed the eigen solution searches.

The result holding unit 165 holds results indicating fitnesses of input values. In other words, for example, the result holding unit 165 holds results for input values of one previous generation of the generation for which processing is currently executed.

Figure 6:
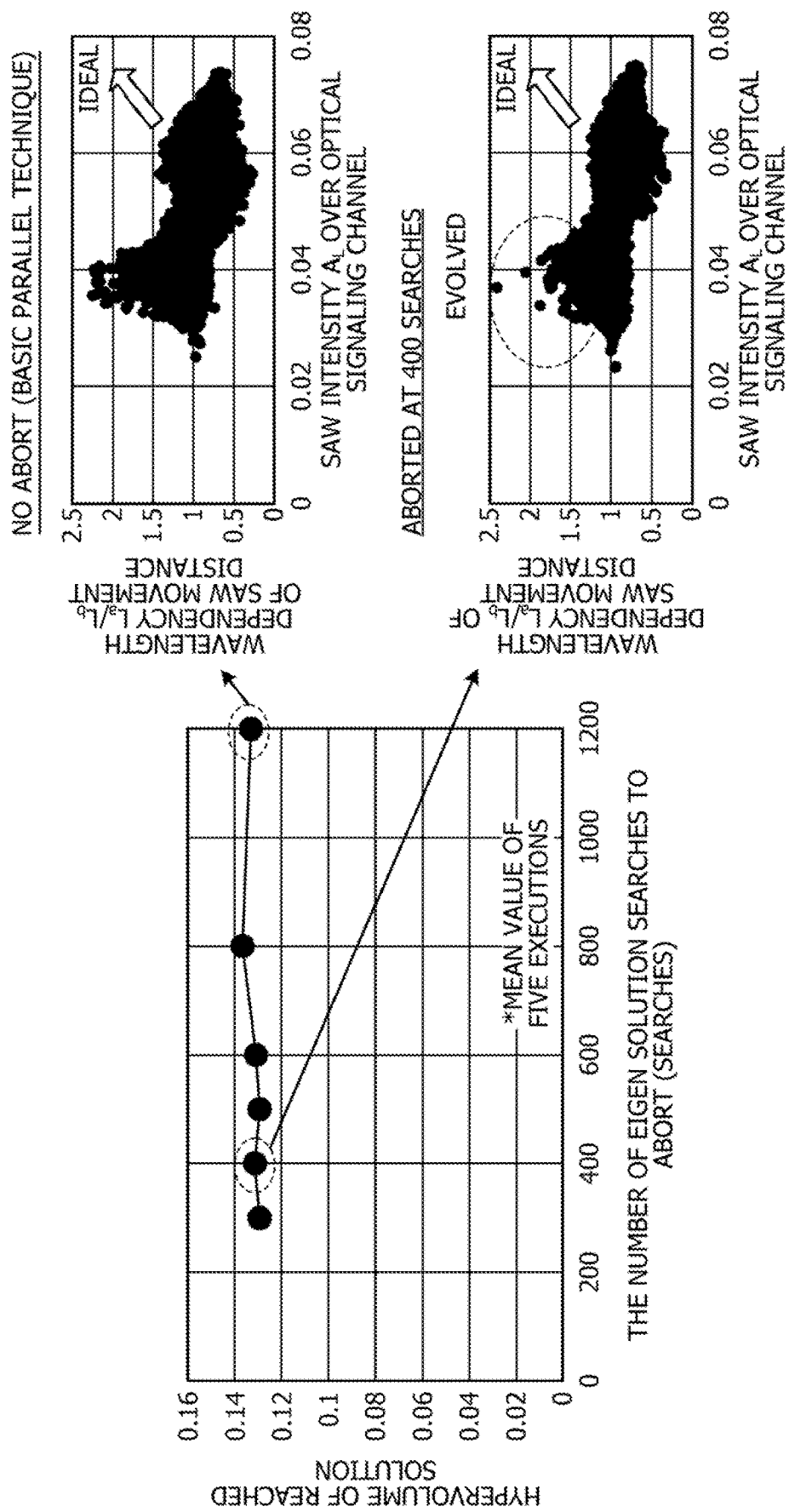
FIG. 6 is a diagram illustrating evaluation results of abort timing control according to Embodiment 1.

FIG. 6 is a diagram illustrating evaluation results of abort timing control according to Embodiment 1. The left part of FIG. 6 illustrates a graph having an X axis indicating the number of eigen solution searches to abort and a Y axis indicating hypervolume of the eigen solutions (reached solutions) reached by evolutionary computation. The right part of FIG. 6 illustrates a solution distribution indicating a relationship of quality of eigen solutions (reached solutions) reached by evolutionary computation when the X axis indicates SAW intensity $A_L$ over an optical signaling channel as one fitness and the Y axis indicates wavelength dependency (La/Lb) of an SAW movement distance as one fitness. The upper right part of FIG. 6 is a solution distribution in a case where the eigen solution searches are not aborted. The lower right part of FIG. 6 is a solution distribution in a case where the number of eigen solution searches to abort is 400. The term "hypervolume" of a reached solution refers to an evaluation scale for a solution distribution and is an area calculated from the solution distribution.

As illustrated in the left part of FIG. 6, even when the number of eigen solution searches to abort is 400, the hypervolume has a reaching degree that is substantially equal to that of a case where the number of eigen solution searches to abort is 1200. As illustrated in the right part of FIG. 6, even when the number of eigen solution searches to abort is 400, it may be said that the variety of the reached solutions is maintained, compared with the case where the eigen solution searches are not aborted. In other words, for example, when the abort timing control according to Embodiment 1 is performed, the evolution in the upper direction (the direction of the increase of La/Lb) of the solution distribution as illustrated in the lower right part of FIG. 6 may be maintained without aborting, compared with the case where the eigen solution searches are not aborted. It is inferred that this is because even individuals for which the number of searches is high are not removed and are used in the evolution of the next generation. It is inferred that, as a result, the quality (hypervolume) may be maintained.

[Flowchart of Model Generation]

Figure 7:
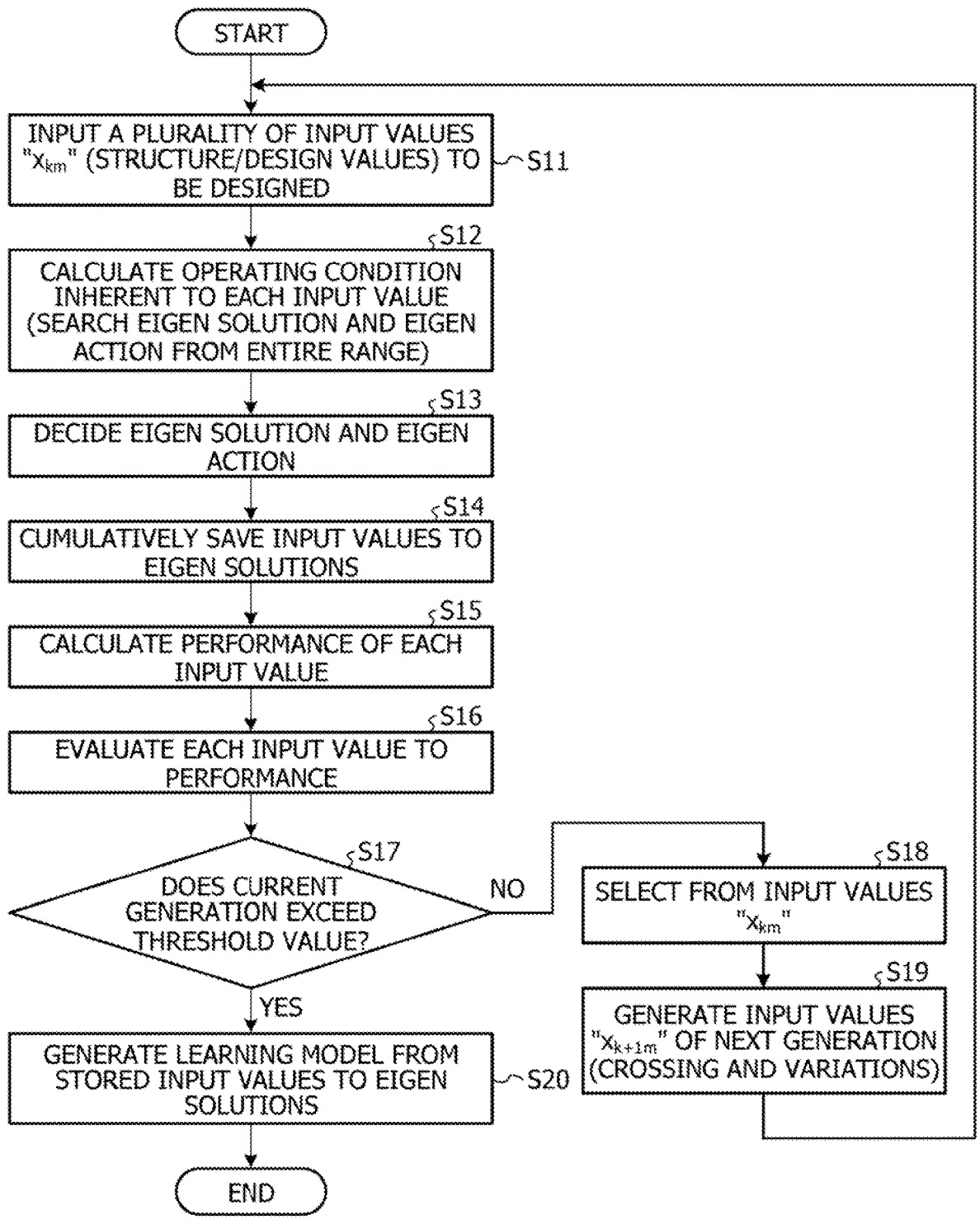
FIG. 7 is a diagram illustrating an example of a flowchart for the model generation according to Embodiment 1.

FIG. 7 is a diagram illustrating an example of a flowchart for model generation according to Embodiment 1. The initial value of the generation k is assumed to be "1".

As illustrated in FIG. 7, the input unit 11 inputs a plurality of input values "$x_{km}$" to be designed (structures/design values) (step S11).

The HPC calculating unit 121 calculates an eigen operating condition for each of the input values "$x_{km}$" (step S12). For example, when $A_1=1$ and $B_1=0$ of the eigen solution condition in Expression (2) are input, the HPC calculating unit 121 calculates the function h(z) for acquiring $A_n$ for each of the input values. The HPC calculating unit 121 solves the equation resulting in $A_n$ or h(z) equal to zero with respect to all possible points of z because of the condition of $A_n=0$ of the eigen solution condition in Expression (2) for each of the input values.

The HPC calculating unit 121 decides the eigen solution and the eigen action for each of the input values (step S13). For example, the HPC calculating unit 121 decides, as an eigen solution, the value of z with which the equation h(z) is solved to zero as a result for each of the input values. Based on Expression (1), the HPC calculating unit 121 computes, as an eigen action, an SAW intensity distribution corresponding to the decided eigen solution. The HPC calculating unit 121 substitutes the eigen solution for Neff in Expression (1) to compute an SAW intensity distribution corresponding to the eigen solution.

The input/output holding unit 161 cumulatively stores the eigen solutions for the input values in the input/output storage unit 21 (step S14).

The HPC calculating unit 121 calculates the performances of the input values (step S15). For example, the HPC calculating unit 121 calculates, as one fitness, an SAW intensity corresponding to the position of the optical signaling channel of each of the structures indicated by the input values from the SAW intensity distribution for the input values. In addition, the HPC calculating unit 121 computes the value of the wavelength dependency (La/Lb) of the SAW movement distance to the input value as one fitness. The performance evaluating unit 13 evaluates the performances of the input values based on the fitness of each of the input values (step S16).

The performance evaluating unit 13 determines whether the current generation exceeds a threshold value or not (step S17). If it is determined that the current generation does not exceed the threshold value (No in step S17), the evolutionary computation unit 14 selects input values from the current input values "$x_{km}$" based on the evaluation results (step S18).

The evolutionary computation unit 14 generates input values "$x_{k+1m}$" of the next generation (step S19). For example, the evolutionary computation unit 14 crosses the selected input values and changes the crossed input values to generate the input values of the next generation. The evolutionary computation unit 14 moves to step S11 to perform processing on the next generation.

On the other hand, if it is determined that the current generation exceeds the threshold value (Yes in step S17), the model generating unit 162 generates the learning model 22 that predicts the range in which eigen solutions for the input values exist from the eigen solutions for the stored input values (step S20). The model generation processing ends.

[Flowchart for Structure Design by GA]

Figure 8A:
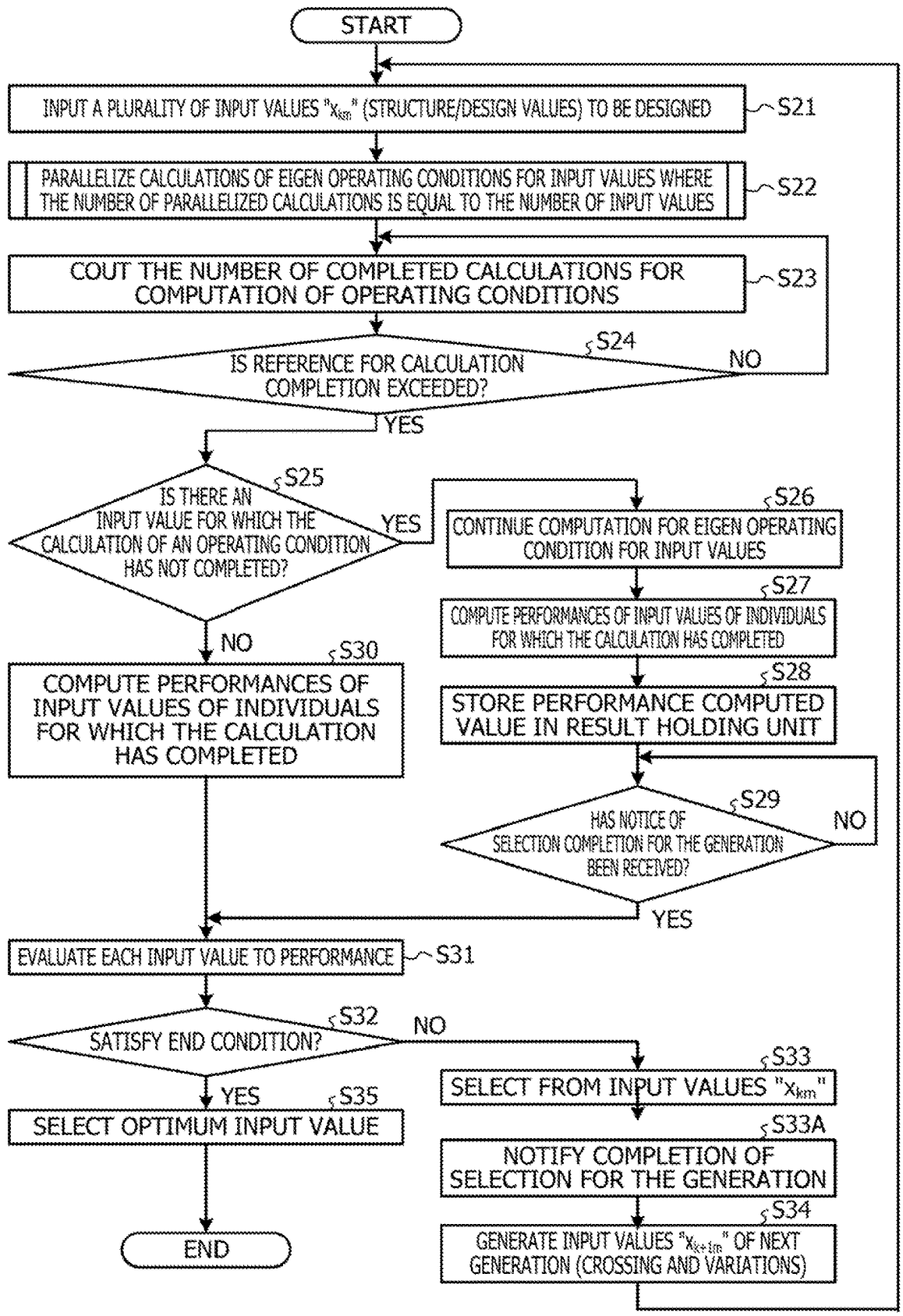
FIG. 8A is a diagram illustrating an example of a flowchart for structure design by GA according to Embodiment 1.

FIG. 8A is a diagram illustrating an example of a flowchart for structure design by GA according to Embodiment 1. The initial value of the generation k is assumed to be the threshold value used for the model generation+1.

As illustrated in FIG. 8A, the input unit 11 inputs a plurality of input values "$x_{km}$" to be designed (structures/design values) (step S21).

The HPC calculating unit 121 processes the calculations of eigen operating conditions for input values in parallel where the number of the parallel calculations is equal to the number of input values (step S22). In other words, for example, the HPC calculating unit 121 processes eigen solution searches for the input values in parallel where the number of the parallel eigen solution searches is equal to the number of individuals. A flowchart for the eigen solution searches will be described below.

The abort timing control unit 164 counts the number of completed calculations for computation of the operating conditions (step S23). The abort timing control unit 164 determines whether a reference for calculation completion is exceeded or not (step S24). For example, the abort timing control unit 164 determines whether the number of searches of eigen solution search exceeds a reference value or not by handling the number of searches of eigen solution search as a reference for calculation completion. The abort timing control unit 164 may use the calculation time of the eigen solution searches instead of the number of searches of eigen solution search as the reference for the calculation completion. The abort timing control unit 164 may use the number of individuals (the number of input values) for which eigen solution search has been completed as the reference for the calculation completion. The abort timing control unit 164 may use the proportion of the number of HPC calculating units 121 in execution which have completed the eigen solution searches as the reference for the calculation completion.

If it is determined that the reference for the calculation completion is not exceeded (No in step S24), the abort timing control unit 164 further moves to step S23 to count the number of completed calculations for computation of the operating conditions.

On the other hand, if it is determined that the reference for the calculation completion is exceeded (Yes in step S24), the abort timing control unit 164 determines whether there is an input value for which the calculation of an operating condition has not completed or not (step S25). If it is determined that there is an input value for which the calculation of an operating condition has not completed (Yes in step S25), the abort timing control unit 164 notifies the HPC calculating unit 121 of that it is abort timing. The HPC calculating unit 121 having received the notice of abort timing continues the computation for the eigen operating conditions for the input values (step S26).

The HPC calculating unit 121 computes the performances of the input values of the individuals for which the calculation has completed (step S27). For example, the HPC calculating unit 121 computes, as one fitness, an SAW intensity corresponding to the position of the optical signaling channel of the structure indicated by each of the input values from the SAW intensity distribution for each of the input values. In addition, the HPC calculating unit 121 computes the value of the wavelength dependency (La/Lb) of the SAW movement distance to each of the input values as one fitness. The HPC calculating unit 121 stores the computed fitness in the result holding unit 165 (step S28).

The HPC calculating unit 121 determines whether a notice of selection completion for the generation has been received or not (step S29). If it is determined that the notice of selection completion for the generation has not been received (No in step S29), the HPC calculating unit 121 repeats the determination processing until the notice of the selection completion for the generation is received.

On the other hand, if it is determined that the notice of selection completion for the generation has been received (Yes in step S29), the HPC calculating unit 121 moves to step S31 to evaluate the performance.

If it is determined in step S25 that there is no input value for which the calculation of an operating condition has not completed (No in step S25), the HPC calculating unit 121 computes a performance of each of the input values of the individual for which the calculation has completed (step S30). For example, the HPC calculating unit 121 computes, as one fitness, an SAW intensity corresponding to the position of the optical signaling channel of the structure indicated by each of the input values from the SAW intensity distribution for each of the input values. In addition, the HPC calculating unit 121 computes the value of the wavelength dependency (La/Lb) of the SAW movement distance to each of the input values as one fitness. The HPC calculating unit 121 moves to step S31 to evaluate the performance.

In step S31, the performance evaluating unit 13 evaluates the performance of each of the input values based on the fitness for each input value computed by the HPC calculating unit 121 and the fitness for each input value stored by the result holding unit 165 (step S31).

The performance evaluating unit 13 determines whether an end condition is satisfied or not (step S32). If it is determined that the end condition is not satisfied (No in step S32), the evolutionary computation unit 14 selects input values from the current input values "$x_{km}$" based on the evaluation results (step S33). The evolutionary computation unit 14 notifies the HPC calculating unit 121 of the completion of the selection (step S33A).

The evolutionary computation unit 14 generates input values "$x_{k+1m}$" of the next generation (step S34). For example, the evolutionary computation unit 14 crosses the selected input values and changes the crossed input values to generate the input values of the next generation. The evolutionary computation unit 14 moves to step S21 to perform processing on the next generation.

On the other hand, if it is determined that the end condition is satisfied (Yes in step S32), the performance evaluating unit 13 selects an optimum input value based on the result of the performance evaluation for each of the input values (step S35). The GA processing ends.

[Flowchart of Eigen Solution Search]

Figure 8B:
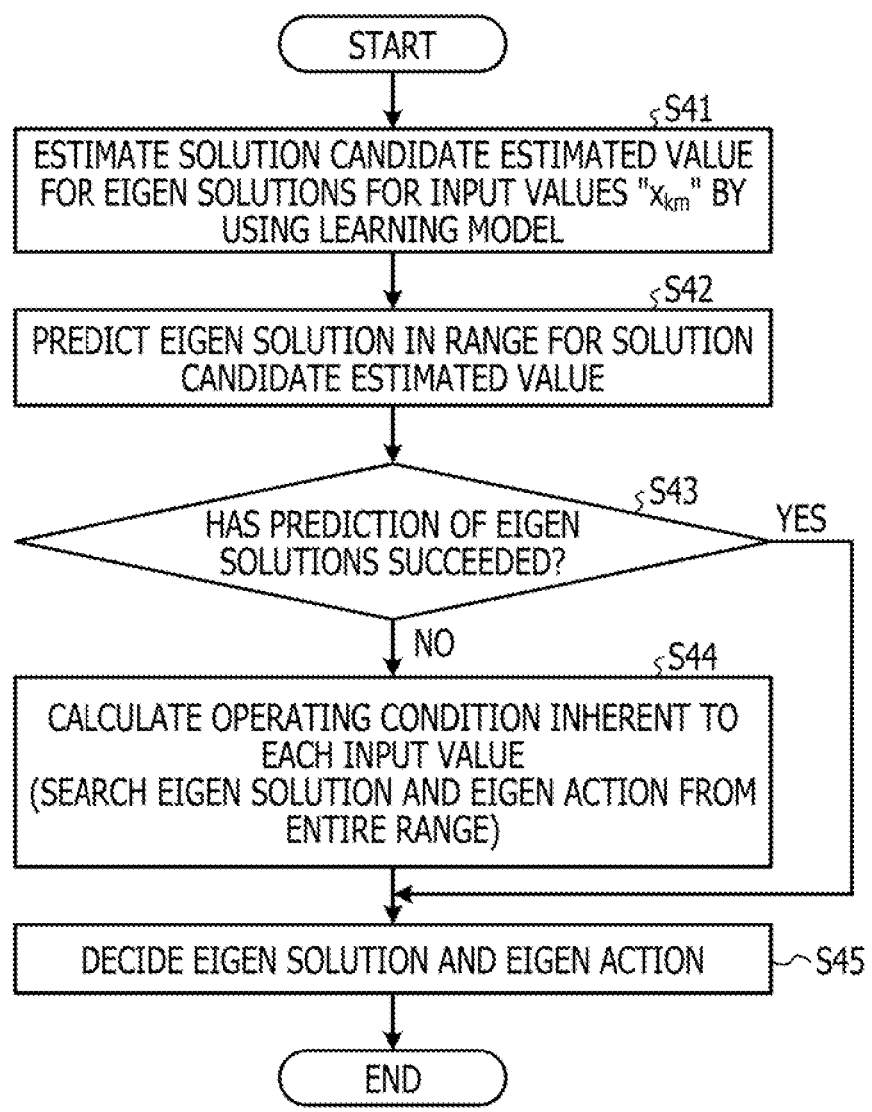
FIG. 8B is a diagram illustrating an example of a flowchart for eigen solution search according to Embodiment 1.

FIG. 8B is a diagram illustrating an example of a flowchart for eigen solution search according to Embodiment 1.

As illustrated in FIG. 8B, by using the learning model 22, the eigen solution predicting unit 163 estimates a solution candidate range for eigen solutions for input values (step S41). The eigen solution predicting unit 163 predicts an eigen solution in the solution candidate range (step S42). For example, when $A_1=1$ and $B_1=0$ of the eigen solution condition in Expression (2) are input, the eigen solution predicting unit 163 calculates the function $h(z)$ for acquiring $A_n$ for each of the input values. The eigen solution predicting unit 163 solves the equation resulting in $A_n$ or $h(z)$ equal to zero with respect to points of z in the estimated solution candidate range because of the condition of $A_n=0$ of the eigen solution condition in Expression (2) for each of the input values to predict an eigen solution. In other words, for example, the eigen solution predicting unit 163 substitutes values of z within the eigen solution range sequentially for the equation $h(z)$ and predicts the value of z resulting in zero as an eigen solution.

The eigen solution predicting unit 163 determines whether the eigen solution prediction has succeeded or not (step S43). If it is determined that the eigen solution prediction has succeeded (Yes in step S43), the eigen solution predicting unit 163 moves to step S45.

On the other hand, if it is determined that the eigen solution prediction has not succeeded (No in step S43), the HPC calculating unit 121 calculates an eigen operating condition for the input values "$x_{km}$" (step S44). For example, when $A_1=1$ and $B_1=0$ of the eigen solution condition in Expression (2) are input, the HPC calculating unit 121 calculates the function $h(z)$ for acquiring $A_n$ for each of the input values. The HPC calculating unit 121 solves the equation resulting in $A_n$ or $h(z)$ equal to zero with respect to all possible points of z because of the condition of $A_n=0$ of the eigen solution condition in Expression (2) for each of the input values to predict an eigen solution. The HPC calculating unit 121 moves to step S45.

The HPC calculating unit 121 decides the eigen solution and the eigen action for each of the input values (step S45). For example, the HPC calculating unit 121 decides, as an eigen solution, the value of z with which the equation $h(z)$ is solved to zero as a result for each of the input values. Based on Expression (1), the HPC calculating unit 121 computes, as an eigen action, an SAW intensity distribution corresponding to the decided eigen solution. The HPC calculating unit 121 substitutes the eigen solution for Neff in Expression (1) to compute an SAW intensity distribution corresponding to the eigen solution.

Effects of Embodiment 1

According to Embodiment 1, in evolutionary computation that calculates fitnesses of a plurality of individuals based on a plurality of inputs by parallel processing, the arithmetic processing unit 1 performs the following processing. The arithmetic processing unit 1 decides individuals not to be evolved to individuals of the second generation that is the next generation of the first generation based on a predetermined reference for calculation completion of fitness calculations (performance calculations) for a plurality of individuals (input values) in the first generation, which are calculated by the plurality of HPC calculating units 121. The arithmetic processing unit 1 decides to cause the individuals not to be evolved to individuals of the second generation to evolve to individuals of a generation next or subsequent to the second generation. According to this configuration, the arithmetic processing unit 1 may keep variety of eigen solutions for fitness calculations and, at the same time, reduce the waiting time due to fluctuations of calculation times when fitness calculations for individuals in evolutionary computation are processed in parallel.

According to Embodiment 1 described above, the arithmetic processing unit 1 decides individuals not to be evolved to individuals of the second generation that is the next generation of the first generation based on the number of searches for searching eigen solutions in fitness calculation for a plurality of individuals in the first generation. The arithmetic processing unit 1 causes the searches for eigen solutions for the decided individuals to continue and decides to cause the individuals to evolve to individuals of a generation next or subsequent to the second generation. According to this configuration, the arithmetic processing unit 1 uses the number of searches for searching eigen solutions as the timing for deciding individuals for which the searches for eigen solutions are continued and which are not evolved to individuals of the second generation so that the variety of the eigen solutions may be kept and, at the same time, the waiting time due to fluctuations of calculation times may be reduced.

According to Embodiment 1 described above, the arithmetic processing unit 1 decides individuals not to be evolved to individuals of the second generation that is the next generation of the first generation based on the calculation times for searching eigen solutions in fitness calculations for a plurality of individuals in the first generation. The arithmetic processing unit 1 causes the searches for eigen solutions for the decided individuals to continue and decides to cause the individuals to evolve to individuals of a generation next or subsequent to the second generation. According to this configuration, the arithmetic processing unit 1 uses the calculation times for searching eigen solutions as timing for deciding individuals for which the searches for eigen solutions are continued and which are not evolved to individuals of the second generation so that the variety of the eigen solutions may be kept and, at the same time, the waiting time due to fluctuations of calculation times may be reduced.

According to Embodiment 1 described above, the arithmetic processing unit 1 decides individuals not to be evolved to individuals of the second generation that is the next generation of the first generation based on the number of completed individuals in fitness calculations for a plurality of individuals in the first generation. The arithmetic processing unit 1 causes the searches for eigen solutions for the decided individuals to continue and decides to cause the individuals to evolve to individuals of a generation next or subsequent to the second generation. According to this configuration, the arithmetic processing unit 1 uses the number of individuals for which the calculations have been completed as timing for deciding individuals for which the searches for eigen solutions are continued and which are not evolved to individuals of the second generation so that the variety of the eigen solutions may be kept and, at the same time, the waiting time due to fluctuations of calculation times may be reduced.

Embodiment 2

According to Embodiment 1, it has been described that the abort timing control processing is performed by the arithmetic processing unit 1 when the number of individuals of one generation is lower than the number of HPC calculating units 121 that perform arithmetic processing. However, the abort timing control processing may be performed by the arithmetic processing unit 1 when the number of individuals of one generation is higher than the number of HPC calculating units 121 that perform arithmetic processing.

Accordingly, in Embodiment 2, abort timing control processing performed by the arithmetic processing unit 1 when the number of individuals of one generation is higher than the number of HPC calculating units 121 that perform arithmetic processing will be described.

Figure 9:
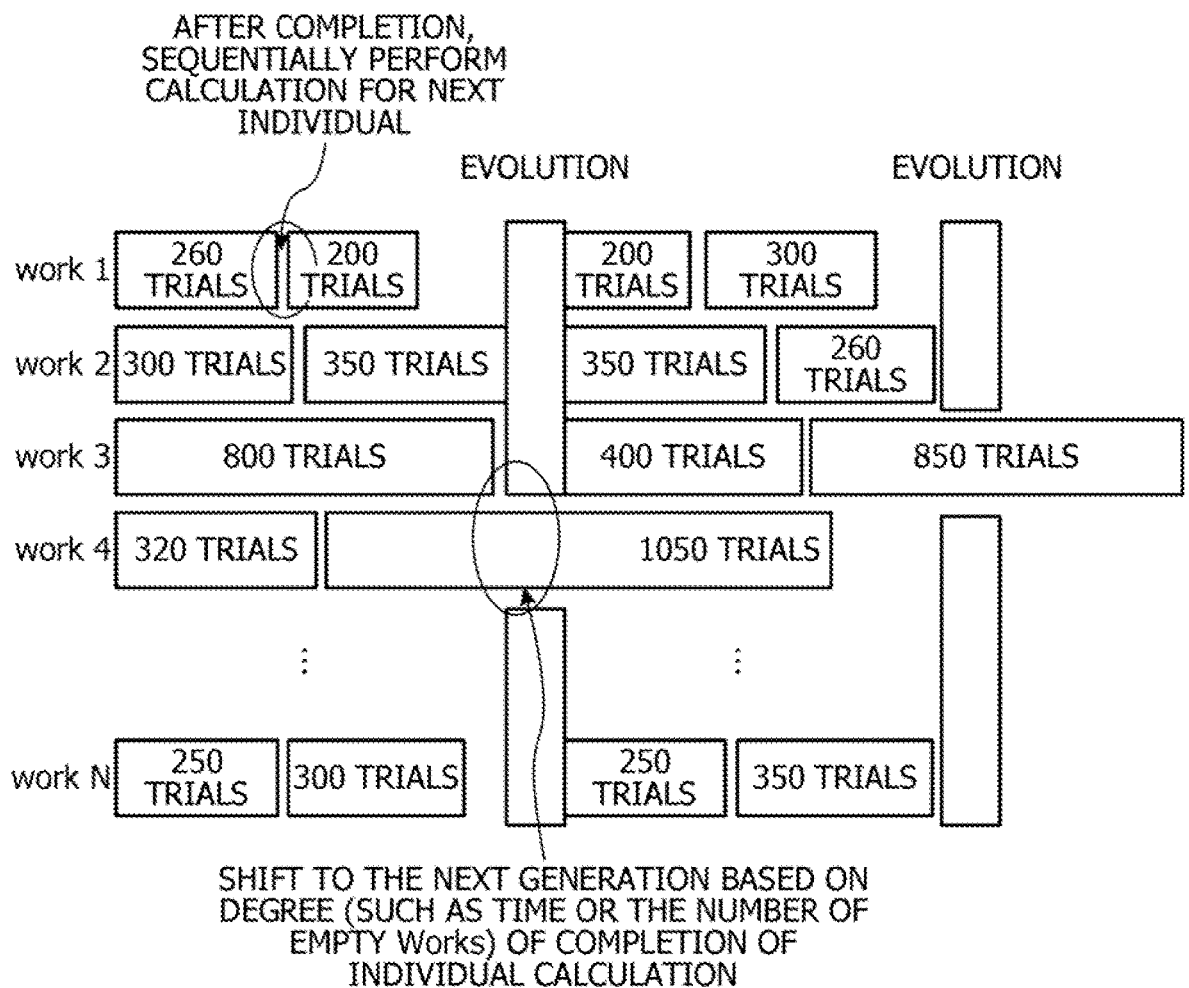
FIG. 9 is a diagram illustrating an example of abort timing control over eigen solution search according to Embodiment 2.

FIG. 9 is a diagram illustrating an example of abort timing control for eigen solution search according to Embodiment 2. As illustrated in FIG. 9, when the number of individuals of one generation is higher than the number of the HPC calculating units 121, the arithmetic processing unit 1 assigns individuals to all of the HPC calculating units 121, causes the HPC calculating units 121 to execute calculations for the individuals and causes the HPC calculating units 121 having completed the calculations to sequentially execute calculations for individuals the calculations for which have not been executed. If a reference for calculation completion is exceeded in the generation in execution, the arithmetic processing unit 1 aborts to search individuals for which the calculations of eigen solution search have not been completed in the generation and causes the individuals to join to one subsequent generation. The reference for the calculation completion may be a calculation time of one generation, the number of individuals (the number of input values) for which eigen solution search has been completed or a proportion of the number of HPC calculating units 121 which have completed the eigen solution search.

For example, in a case where the reference for calculation completion is a calculation time of one generation, the arithmetic processing unit 1 performs evaluation of fitness on individuals having searches completed when the calculation time of one generation exceeds a reference value, causes the individuals to evolve, and shifts the processing to the next generation. The arithmetic processing unit 1 causes individuals for which the searches have not been completed when the calculation time of one generation exceeds the reference value to join to the next generation. In the evolutionary computation, it is considered that performing the evolution processing (selection, crossing, variations and so on) in one subsequent generation has a minor influence.

[Flowchart for Structure Design by GA]

Figure 10A:
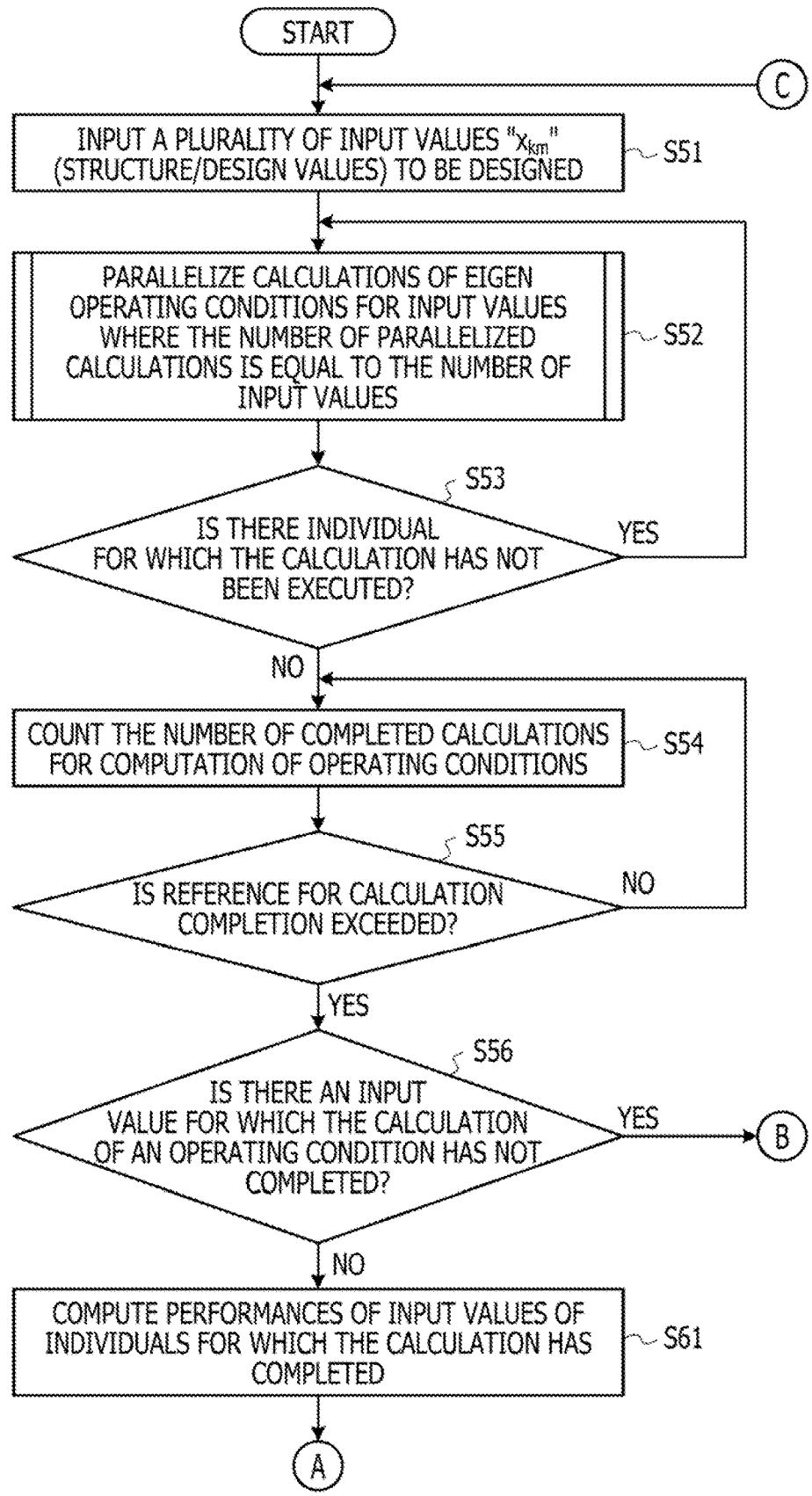
FIG. 10A is a diagram illustrating an example of a flowchart for structure design by GA according to Embodiment 2.
Figure 10B:
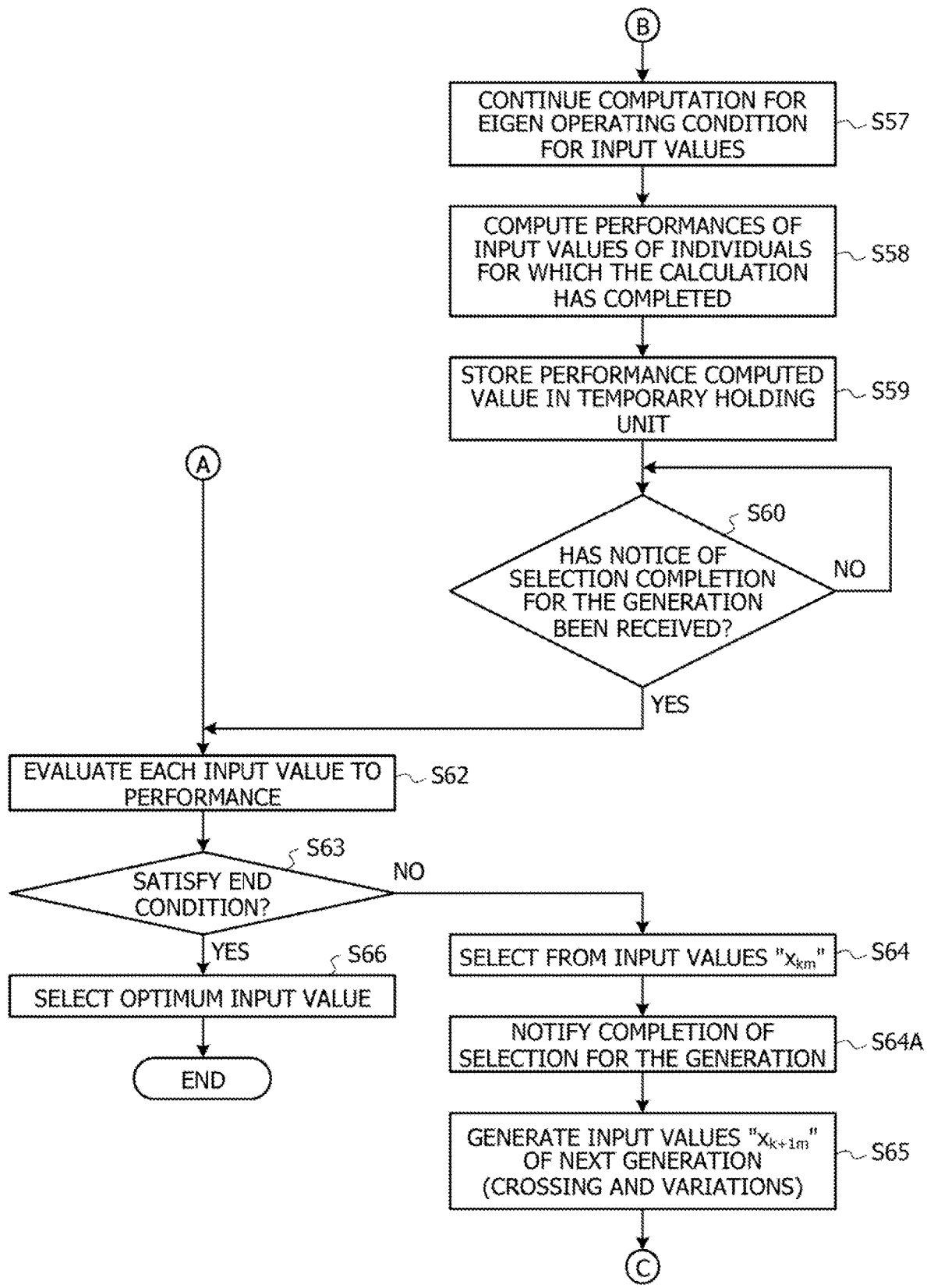
FIG. 10B is a diagram illustrating an example of a flowchart for structure design by GA according to Embodiment 2.
Figure 12:
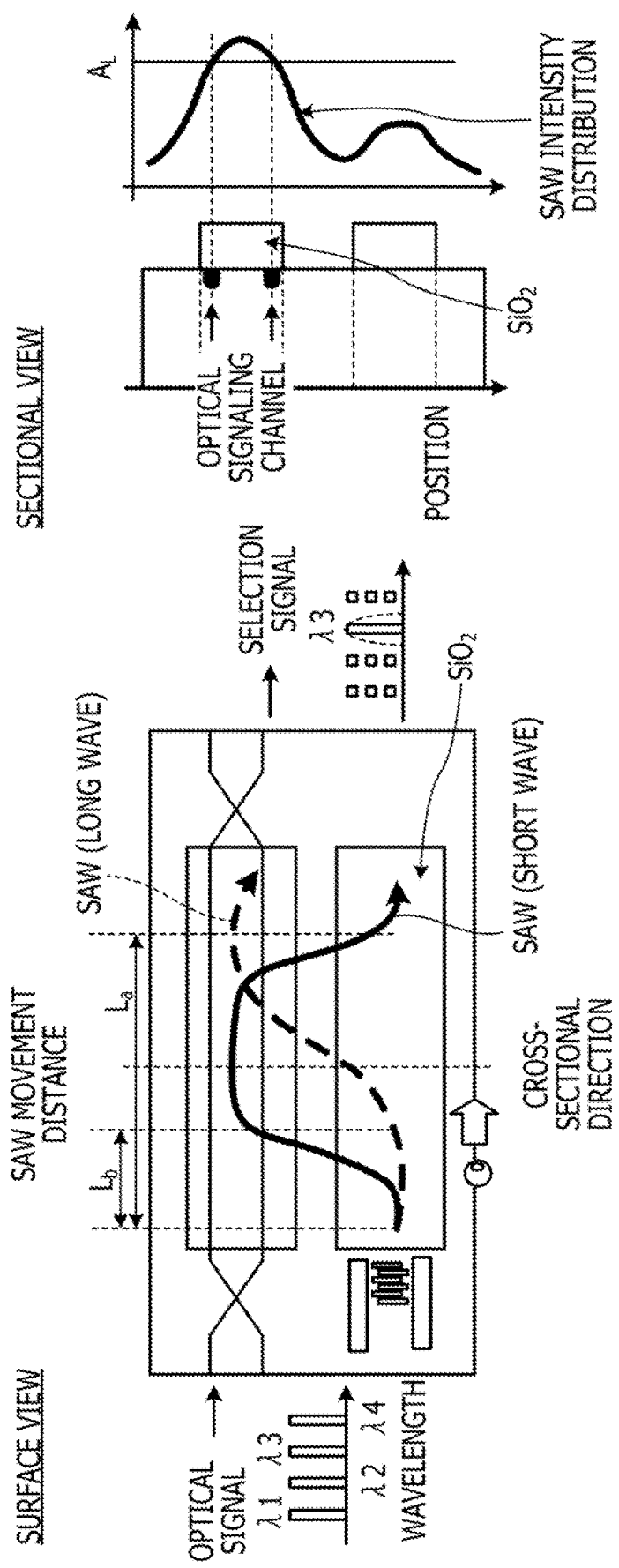
FIG. 12 is a diagram illustrating a reference example of a design of an optimum structure of $SiO_2$ layer positioning.
Figure 13:
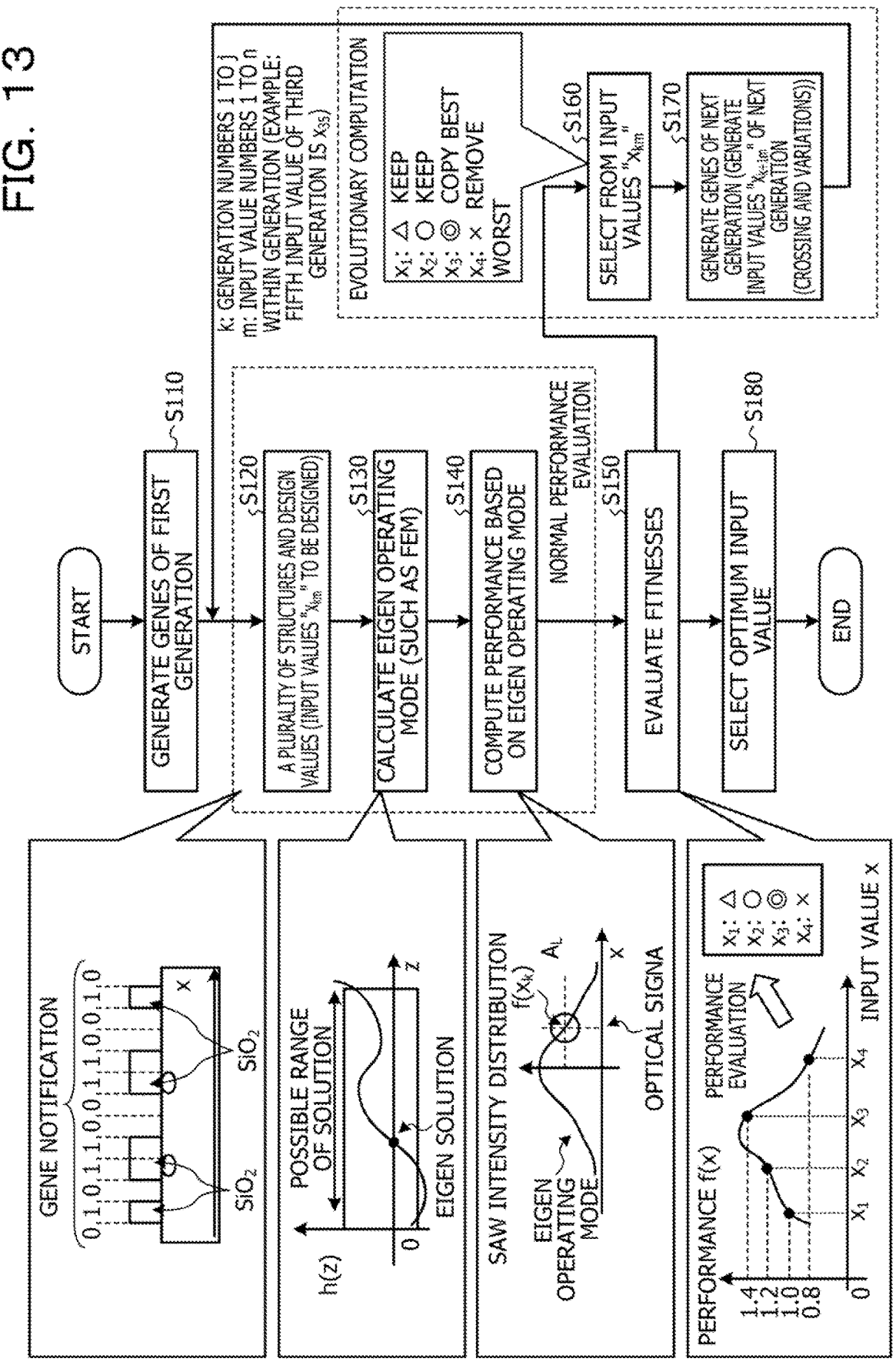
FIG. 13 is a diagram illustrating a reference example of a flowchart for a structure design for an $SiO_2$ layer by GA.
Figure 14:
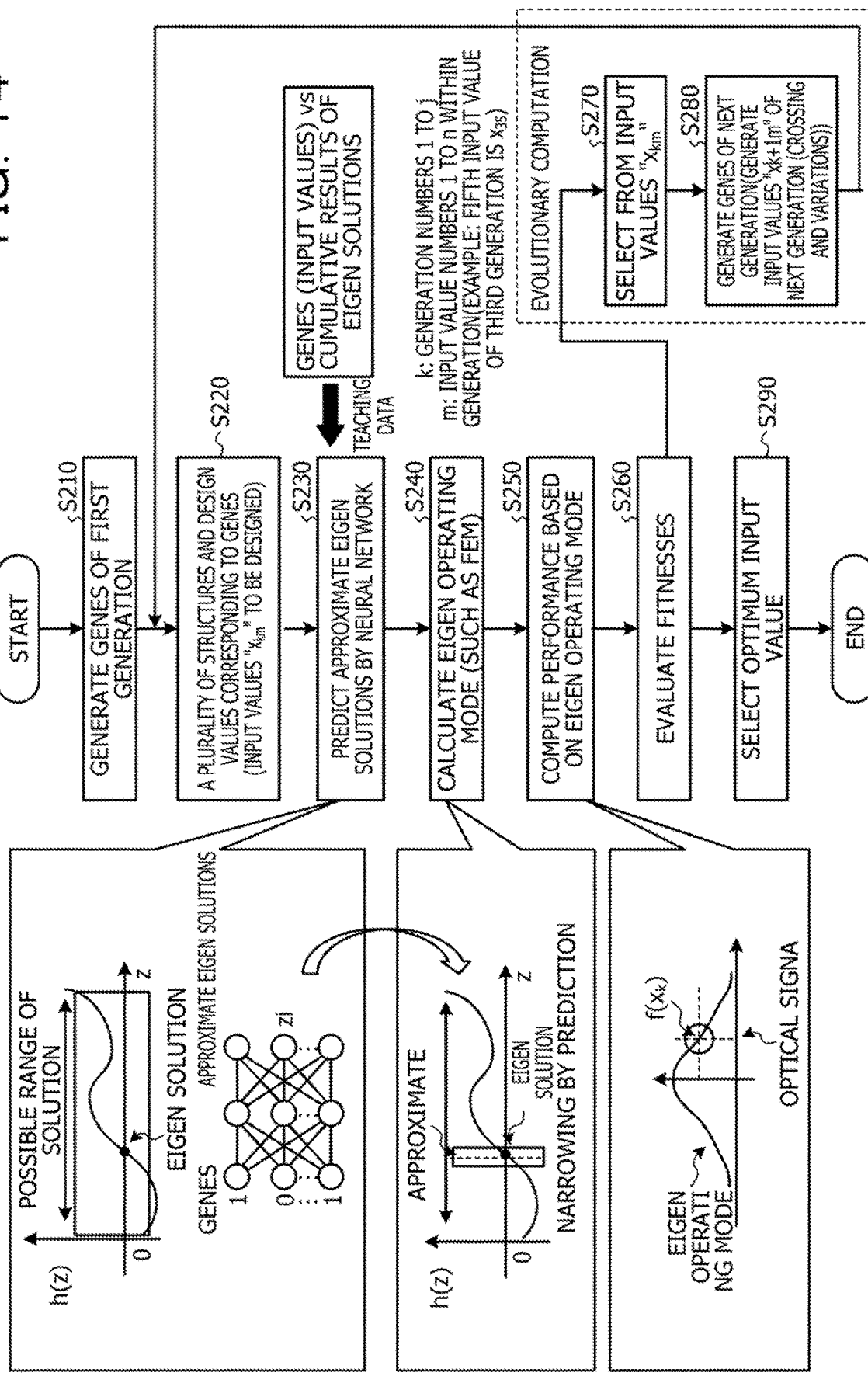
FIG. 14 is a diagram illustrating a reference example of a flowchart for a structure design for an $SiO_2$ layer by GA using NN prediction.
Figure 15:
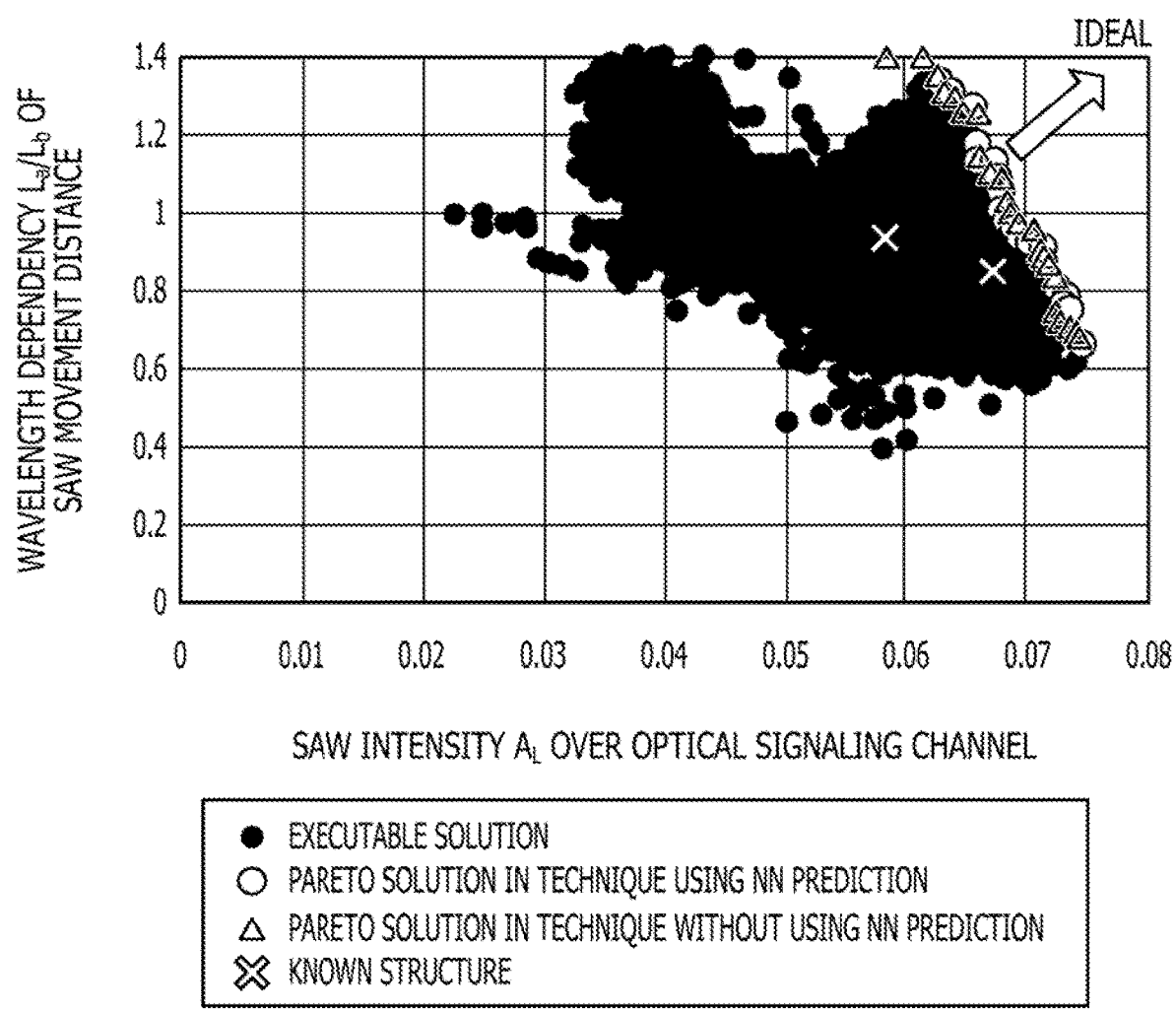
FIG. 15 is a diagram illustrating a reference example indicating reached solutions by GA.
Figure 16:
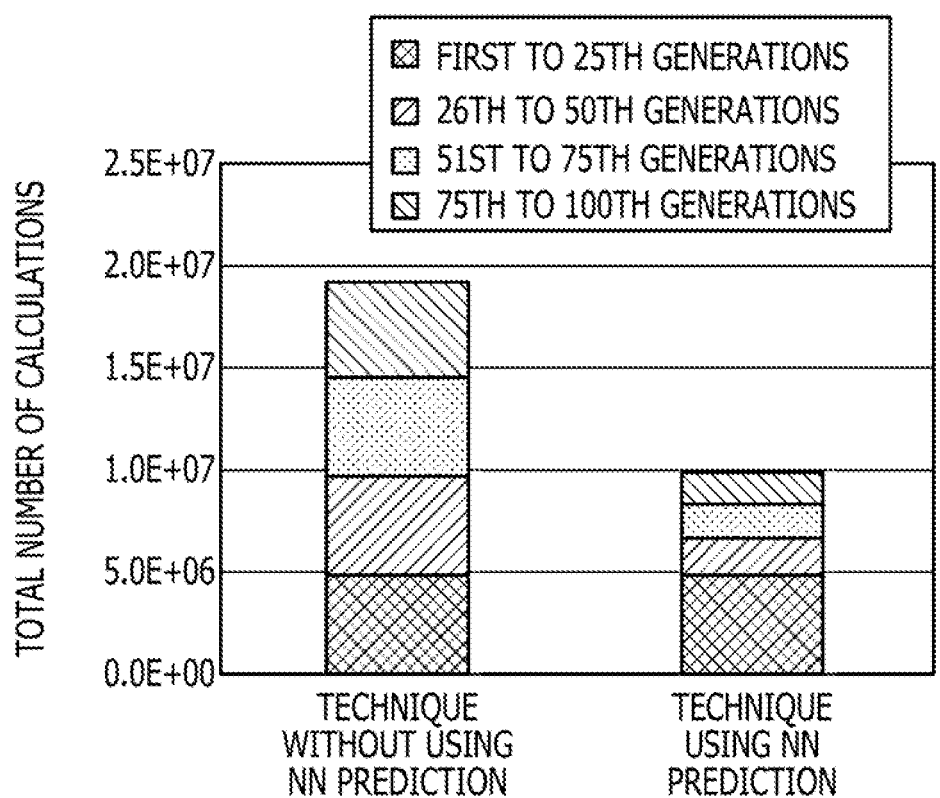
FIG. 16 is a diagram illustrating a reference example indicating the total number of calculations executed by GA.

FIG. 10A to 10B is a diagram illustrating an example of a flowchart for structure design by GA according to Embodiment 2. The initial value of the generation k is assumed to be the threshold value used for the model generation+1.

As illustrated in FIG. 10A, the input unit 11 inputs a plurality of input values "$x_{km}$" to be designed (structures/design values) (step S51).

The HPC calculating units 121 process the calculations of eigen operating conditions for the input values in parallel where the number of the parallel calculations is equal to the number of input values (step S52). In other words, for example, the HPC calculating unit 121 processes eigen solution searches for the input values in parallel where the number of the parallel eigen solution searches is equal to the number of individuals. Because the flowchart of eigen solution search has been described with reference to FIG. 8B, the description will be omitted.

Each of the HPC calculating units 121 determines whether there is an individual for which the calculation has not been executed or not (step S53). If it is determined that there is an individual for which the calculation has not been executed (Yes in step S53), the HPC calculating unit 121 moves to step S52 to perform processing on the individual for which the calculation has not been executed. On the other hand, if it is determined that there is not an individual for which the calculation has not been executed (No in step S53), the HPC calculating unit 121 waits.

The abort timing control unit 164 counts the number of completed calculations for computation of the operating conditions (step S54). The abort timing control unit 164 determines whether a reference for calculation completion is exceeded or not (step S55). For example, the abort timing control unit 164 determines whether the calculation time of one generation exceeds a reference value or not by using the number of searches of eigen solution search as the reference for calculation completion. The abort timing control unit 164 may use the number of individuals (the number of input values) for which eigen solution searches have been completed, instead of the calculation time of one generation, as the reference for the calculation completion. The abort timing control unit 164 may use the proportion of the number of HPC calculating units 121 which have completed the eigen solution searches as the reference for the calculation completion.

If it is determined that the reference for the calculation completion is not exceeded (No in step S55), the abort timing control unit 164 further moves to step S54 to count the number of completed calculations for computation of the operating conditions.

On the other hand, if it is determined that the reference for the calculation completion is exceeded (Yes in step S55), the abort timing control unit 164 determines whether there is an input value for which the calculation of an operating condition has not completed (step S56). If it is determined that there is an input value for which the calculation of an operating condition has not completed (Yes in step S56), the abort timing control unit 164 notifies the corresponding HPC calculating unit 121 of that it is abort timing. The HPC calculating unit 121 having received the notice of abort timing continues the calculations for the eigen operating conditions for the input values (step S57).

The HPC calculating unit 121 computes the performances of the input values of the individuals for which the calculation has completed (step S58). For example, the HPC calculating unit 121 computes, as one fitness, an SAW intensity corresponding to the position of the optical signaling channel of the structure indicated by each of the input values from the SAW intensity distribution for each of the input values. In addition, the HPC calculating unit 121 computes the value of the wavelength dependency (La/Lb) of the SAW movement distance to each of the input values as one fitness. The HPC calculating unit 121 stores the computed fitness in the result holding unit 165 (step S59).

The HPC calculating unit 121 determines whether a notice of selection completion for the generation has been received or not (step S60). If it is determined that the notice of selection completion for the generation has not been received (No in step S60), the HPC calculating unit 121 repeats the determination processing until the notice of selection completion for the generation is received.

On the other hand, if it is determined that the notice of selection completion for the generation has been received (Yes in step S60), the HPC calculating unit 121 moves to step S62 to evaluate the performance.

If it is determined in step S56 that there is no input value for which the calculation of an operating condition has not completed (No in step S56), the HPC calculating unit 121 computes a performance of each of the input values of the individuals for which the calculation has completed (step S61). For example, the HPC calculating unit 121 computes, as one fitness, an SAW intensity corresponding to the position of the optical signaling channel of the structure indicated by each of the input values from the SAW intensity distribution for each of the input values. In addition, the HPC calculating unit 121 computes the value of the wavelength dependency (La/Lb) of the SAW movement distance to each of the input values as one fitness. The HPC calculating unit 121 moves to step S62 to evaluate the performance.

In step S62, the performance evaluating unit 13 evaluates the performance of each of the input values based on the fitness for each input value computed by the HPC calculating unit 121 and the fitness for each input value stored by the result holding unit 165 (step S62).

The performance evaluating unit 13 determines whether an end condition is satisfied or not (step S63). If it is determined that the end condition is not satisfied (No in step S63), the evolutionary computation unit 14 selects input values from the current input values "$x_{km}$," based on the evaluation results (step S64). The evolutionary computation unit 14 notifies the HPC calculating unit 121 of the completion of the selection (step S64A).

The evolutionary computation unit 14 generates input values "$x_{k+1m}$" of the next generation (step S65). For example, the evolutionary computation unit 14 crosses the selected input values and changes the crossed input values to generate the input values of the next generation. The evolutionary computation unit 14 moves to step S51 to perform processing on the next generation.

On the other hand, if it is determined that the end condition is satisfied (Yes in step S63), the performance evaluating unit 13 selects an optimum input value based on the result of the performance evaluation for each of the input values (step S66). The GA processing ends.

Effects of Embodiment 2

According to Embodiment 2 described above, when the number of a plurality of individuals in the first generation is higher than the number of the HPC calculating units 121, each of the HPC calculating units 121 executes the fitness calculation for an individual for which the calculation has not been executed after completing the fitness calculation for one individual. The abort timing control unit 164 decides individuals not to be evolved to individuals of the second generation that is the next generation of the first generation based on a predetermined reference for calculation completion of the fitness calculations for a plurality of individuals in the first generation, which are calculated by the plurality of HPC calculating units 121. According to this configuration, the arithmetic processing unit 1 may keep variety of eigen solutions for fitness calculations and, at the same time, reduce the waiting time due to fluctuations of calculation times even when the number of a plurality of individuals in the first generation is higher than the number of calculating units for parallel calculations.

[Others]

It has been described that the arithmetic processing unit 1 generates the learning model 22 that predicts in which range an eigen solution for an input value exists based on eigen solutions for input values from the first generation to the mth generation searched by the entire range search. The arithmetic processing unit 1 predicts a solution candidate range of the eigen solution for the input value from input values of the (m+1)th generation by using the generated learning model 22 and performs partial range search that searches the eigen solution from the solution candidate range. However, the arithmetic processing unit 1 is not limited thereto but may update the learning model 22 by continuing the learning also in the mth and subsequent generations. The arithmetic processing unit 1 may update the learning model 22 in accordance with the generation on which partial range search is to be performed. For example, the arithmetic processing unit 1 may update the learning model 22 such that the model uses several generations immediately before the generation on which partial range search is to be performed.

The arithmetic processing unit 1 has been described with reference to, as an example, the technique that acquires an eigen solution by predicting in which region the eigen solutions for input values exist by using a learning model. However, without limiting thereto, the technique that acquires an eigen solution is also applicable to evolutionary computation of a technique in the past that performs the entire range search.

The components of the arithmetic processing unit 1 illustrated in the drawings do not necessarily have to be physically configured as illustrated in the drawings. In other words, for example, the specific forms of distribution and integration of the arithmetic processing unit 1 are not limited to those illustrated in the drawings, but all or part thereof may be configured to be functionally or physically distributed or integrated in given units in accordance with various loads, usage states, and so on. For example, the output unit 15 and the input/output holding unit 161 may be integrated as one unit. The HPC calculating unit 121 may be divided into a calculating unit that searches an eigen solution by entire range search, a unit that calculates an objective function based on the eigen solution and a calculating unit that calculates a fitness for an input value based on the objective function. The storage unit 20 may be coupled via a network as an external device of the arithmetic processing unit 1.

The various processes described in the embodiments above may be implemented as a result of a computer such as a personal computer or a workstation executing a program prepared in advance. Hereinafter, an example of a computer that executes the arithmetic processing program implementing functions that are the same as those of the arithmetic processing unit 1 illustrated in FIG. 1 will be described. FIG. 11 is a diagram illustrating an example of a computer that executes the arithmetic processing program.

As illustrated in FIG. 11, a computer 200 includes a CPU 203 that performs various kinds of arithmetic processing, an input device 215 that receives input of data from a user, and a display control unit 207 that controls a display device 209. The computer 200 further includes a drive device 213 that reads a program or the like from a storage medium, and a communication control unit 217 that exchanges data with another computer via a network. The computer 200 further includes a memory 201 that temporarily stores various kinds of information and a hard disk drive (HDD) 205. The memory 201, the CPU 203, the HDD 205, the display control unit 207, the drive device 213, the input device 215, and the communication control unit 217 are coupled to one another via a bus 219.

The drive device 213 is, for example, a device for a removable disk 210. The HDD 205 stores an arithmetic processing program 205a and arithmetic processing related information 205b.

The CPU 203 reads the arithmetic processing program 205a, develops the arithmetic processing program 205a in the memory 201, and executes the arithmetic processing program 205a as a process. Such processes correspond to the respective functional units of the arithmetic processing unit 1. The arithmetic processing related information 205b corresponds to the input/output storage unit 21 and the learning model 22. For example, the removable disk 210 stores various information on the arithmetic processing program 205a or the like.

The arithmetic processing program 205a may not necessarily have to be stored in the HDD 205 from the beginning. For example, the arithmetic processing program 205a may be stored in a "portable physical medium" such as a flexible disk (FD), a compact disk read-only memory (CD-ROM), a digital versatile disk (DVD), a magneto-optical disk, or an integrated circuit (IC) card inserted into the computer 200. The computer 200 may execute the arithmetic processing program 205a by reading the arithmetic processing program 205a from the portable physical medium.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An arithmetic processing apparatus of calculating in an evolutionary computation that calculates fitnesses of a plurality of individuals by parallel processing, the plurality of individuals being based on a plurality of inputs, the apparatus comprising:
   a memory; and
   a processor circuit coupled to memory and configured to:
   use, in the processor circuit, a technique that, for calculating a fitness of an individual, performs prediction of an eigen solution by using a predictor represented by a neural network and starts a calculation for search of the eigen solution from a result of the prediction to acquire an accurate eigen solution;
   determine, in the processor circuit, an individual not to be evolved to an individual of a second generation from among a plurality of individuals in a first generation based on a predetermined reference for calculation completion of fitness calculation for each of the plurality of individuals, the second generation being a generation next to the first generation, the predetermined reference for calculation completion is one of a number of searches for searching an eigen solution of fitness calculation for the plurality of individuals in the first generation, a calculation time for searching an eigen solution which is taken for fitness calculation for a plurality of individuals in the first generation, a number of completed individuals of fitness calculation for a plurality of individuals in the first generation, or a proportion of eigen solution searches that are completed; and
   determine, in the processor circuit, to cause the determined individual to evolve to an individual of a generation next or subsequent to the second generation.

2. The arithmetic processing apparatus according to claim 1, wherein the processor circuit is further configured to:
   determine, in the processor circuit, the individual not to be evolved to individuals of the second generation based on the number of searches for searching an eigen solution of fitness calculation for the plurality of individuals in the first generation,
   control, in the processor circuit, to continue the search for an eigen solution for the decided individuals, and
   determine, in the processor circuit, to evolve the individual to individuals of a generation that is a next or subsequent generation of the second generation.

3. The arithmetic processing apparatus according to claim 1, wherein the processor circuit is further configured to:
   determine, in the processor circuit, the individual not to be evolved to individuals of the second generation based on the calculation time for searching an eigen solution,
   control, in the processor circuit, to continue the search for an eigen solution for the individual, and
   determine, in the processor circuit, to evolve the individual to individuals of a generation that is a next or subsequent generation of the second generation based on the continued search.

4. The arithmetic processing apparatus according to claim 1, wherein the processor circuit is further configured to:
   determine, in the processor circuit, the individual not to be evolved to individuals of the second generation based on the number of completed individuals of fitness calculation for a plurality of individuals in the first generation, and
   control, in the processor circuit, to continue the search for an eigen solution for the individual, and
   determine, in the processor circuit, to evolve the decided individuals to individuals of a generation that is a next or subsequent generation of the second generation.

5. The arithmetic processing apparatus according to claim 1, wherein
   the processor circuit is one of a plurality of processors, and
   when the number of a plurality of individuals in the first generation is higher than the number of the plurality of processors, each of the plurality of processors executes the fitness calculation for an individual for which the calculation has not been executed after completing the fitness calculation for one individual.

6. A non-transitory computer-readable storage medium storing a program that causes a processor circuit included in a computer to execute a processing of calculating in an evolutionary computation that calculates fitnesses of a plurality of individuals by parallel processing, the plurality of individuals being based on a plurality of inputs, the processing comprising:
   using, in the processor circuit, a technique that, for calculating a fitness of an individual, performs prediction of an eigen solution by using a predictor represented by a neural network and starts a calculation for search of the eigen solution from a result of the prediction to acquire an accurate eigen solution;
   determining, in the processor circuit, an individual not to be evolved to individual of a second generation from among a plurality of individuals in a first generation based on a predetermined reference for calculation completion of fitness calculation for each of the plurality of individuals, the second generation being a generation next to first generation, wherein the predetermined reference for calculation completion is one of a number of searches for searching an eigen solution of fitness calculation for the plurality of individuals in the first generation, a calculation time for searching an eigen solution which is taken for fitness calculation for a plurality of individuals in the first generation, a number of completed individuals of fitness calculation for a plurality of individuals in the first generation, or a proportion of eigen solution searches that are completed; and determining, in the processor circuit, to cause the determined individual to evolve to individuals of a generation next or subsequent to the second generation.

7. The non-transitory computer-readable storage medium according to claim 6, wherein the processing further comprising:

determining, in the processor circuit, the individual not to be evolved to individuals of the second generation based on the number of searches for searching an eigen solution of fitness calculation for the plurality of individuals in the first generation, controlling, in the processor circuit, to continue the search for an eigen solution for the decided individuals, and determining, in the processor circuit, to evolve the individual to individuals of a generation that is a next or subsequent generation of the second generation.

8. The non-transitory computer-readable storage medium according to claim 6, wherein the processing further comprising:

determining, in the processor circuit, the individual not to be evolved to individuals of the second generation based on the calculation time for searching an eigen solution, controlling, in the processor circuit, to continue the search for an eigen solution for the individual, and determining, in the processor circuit, to evolve the individual to individuals of a generation that is a next or subsequent generation of the second generation based on the continued search.

9. An arithmetic processing method of calculating in an evolutionary computation that calculates fitnesses of a plurality of individuals by parallel processing, the plurality of individuals being based on a plurality of inputs, the arithmetic processing method comprising:

using, in a processor circuit, a technique that, for calculating a fitness of an individual, performs prediction of an eigen solution by using a predictor represented by a neural network and starts a calculation for search of the eigen solution from a result of the prediction to acquire an accurate eigen solution;

determining, in the processor circuit, an individual not to be evolved to individual of a second generation from among a plurality of individuals in a first generation based on a predetermined reference for calculation completion of fitness calculation for a plurality of individuals, the second generation being a generation next to the first generation, the predetermined reference for calculation completion is one of a number of searches for searching an eigen solution of fitness calculation for the plurality of individuals in the first generation, a calculation time for searching an eigen solution which is taken for fitness calculation for a plurality of individuals in the first generation, a number of completed individuals of fitness calculation for a plurality of individuals in the first generation, or a proportion of eigen solution searches that are completed; and determining, in the processor circuit, to cause the determined individual to evolve to individuals of a generation next or subsequent to the second generation.

10. The arithmetic processing method according to claim 9, further comprising:

determining, in the processor circuit, the individual not to be evolved to individuals of the second generation based on the number of searches for searching an eigen solution of fitness calculation for the plurality of individuals in the first generation, controlling, in the processor circuit, to continue the search for an eigen solution for the decided individuals, and determining, in the processor circuit, to evolve the individual to individuals of a generation that is a next or subsequent generation of the second generation.

11. The arithmetic processing method according to claim 9, further comprising:

determining, in the processor circuit, the individual not to be evolved to individuals of the second generation based on the calculation time for searching an eigen solution, controlling, in the processor circuit, to continue the search for an eigen solution for the individual, and determining, in the processor circuit, to evolve the individual to individuals of a generation that is a next or subsequent generation of the second generation based on the continued search.

* * * * *